(12) United States Patent
Brauch et al.

(10) Patent No.: US 6,971,398 B1
(45) Date of Patent: Dec. 6, 2005

(54) HYDRODYNAMIC-FORCE-RESPONSIVE BAFFLE FOR LIQUID TREATMENT BASIN

(75) Inventors: Joseph Karl Brauch, Golden, CO (US); Charles Lonnie Meurer, Golden, CO (US)

(73) Assignee: Meurer Research, Inc., Golden, CO (US)

( * ) Notice: Subject to any disclaimer, the term of this patent is extended or adjusted under 35 U.S.C. 154(b) by 50 days.

(21) Appl. No.: 10/632,614

(22) Filed: Jul. 31, 2003

Related U.S. Application Data

(63) Continuation-in-part of application No. 10/154,902, filed on May 24, 2002, now Pat. No. 6,783,009.

(51) Int. Cl.$^7$ .......................... F16K 17/36; F16K 15/03; B01D 21/00
(52) U.S. Cl. ................... 137/38; 137/493.9; 137/527.8; 210/521
(58) Field of Search .............................. 137/38, 44, 45, 137/493.9, 527.8; 210/130, 513, 521, 522, 210/533, 536

(56) References Cited

U.S. PATENT DOCUMENTS

| | | | | |
|---|---|---|---|---|
| 1,063,637 A | * | 6/1913 | Bqrker ..................... | 137/527.8 |
| 1,348,562 A | * | 8/1920 | Hauser ..................... | 137/527.8 |
| 3,529,728 A | | 9/1970 | Middlebeek et al. ....... | 210/522 |
| 4,039,449 A | | 8/1977 | Soriente ..................... | 210/522 |
| 4,113,232 A | * | 9/1978 | McCabe ..................... | 251/305 |
| 4,405,459 A | | 9/1983 | Smith .......................... | 210/521 |
| 4,889,624 A | | 12/1989 | Soriente et al. ............. | 210/522 |
| 5,397,472 A | | 3/1995 | Bouchard .................... | 210/521 |
| 5,736,037 A | | 4/1998 | Meurer ....................... | 210/541 |
| 5,904,850 A | | 5/1999 | Vellinga ..................... | 210/521 |
| 6,119,723 A | * | 9/2000 | Kenyon .................... | 137/527.8 |
| 6,287,050 B1 | * | 9/2001 | Montgomery et al. ........ | 405/92 |
| 6,343,698 B1 | * | 2/2002 | Than et al. ................. | 210/541 |

OTHER PUBLICATIONS

Strongwell Brochure "Fiberglass Baffle Panels", 2 pages, dated at least as early as May 23, 2001.
Enduro Brochure "Fiberglass Baffle Wall Systems", 4 pages, dated at least as early as May 23, 2001.

* cited by examiner

Primary Examiner—John Rivell
(74) Attorney, Agent, or Firm—C. E. Martine, Jr.

(57) ABSTRACT

A baffle controls the normal process flow of liquid in basins of liquid treatment equipment, but releases uncontrolled flow of the liquid caused by events such as seismic events. Methods provide an unbent blank for making such baffle with a hinge member to facilitate the release of the uncontrolled flow. Further methods provide for mounting of the baffle for movement, urging the baffle for the control of the normal process flow, and allowing the uncontrolled flow to overcome the urging and release the uncontrolled flow. Baffle embodiments may be made from exemplary materials such as stainless steel, glass fiber reinforced polyester, pultruded FRP, and redwood.

2 Claims, 31 Drawing Sheets

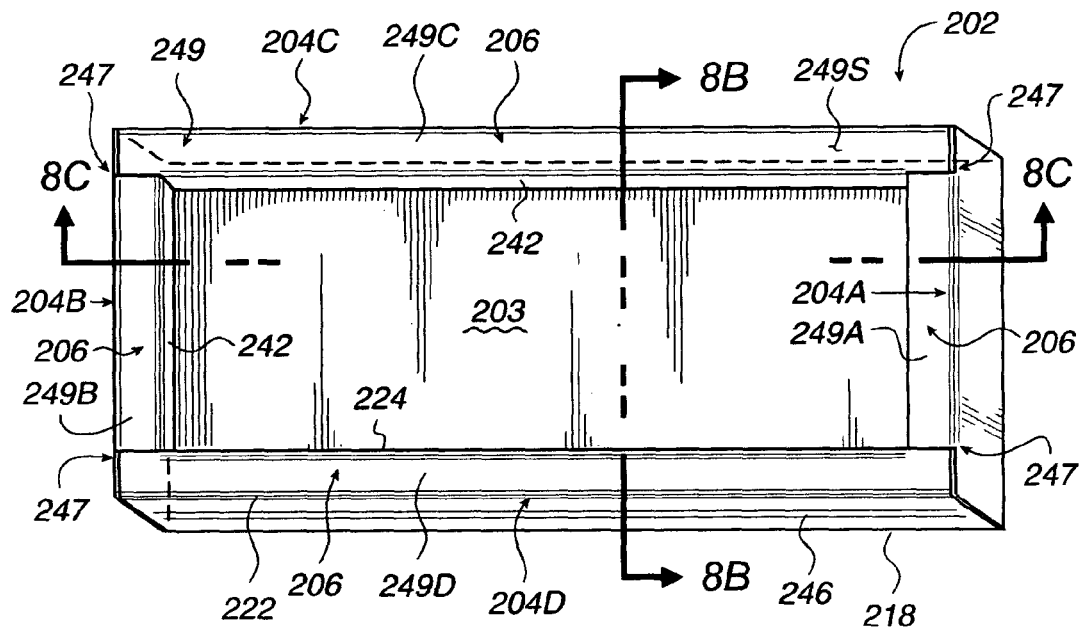
Fig. 8A
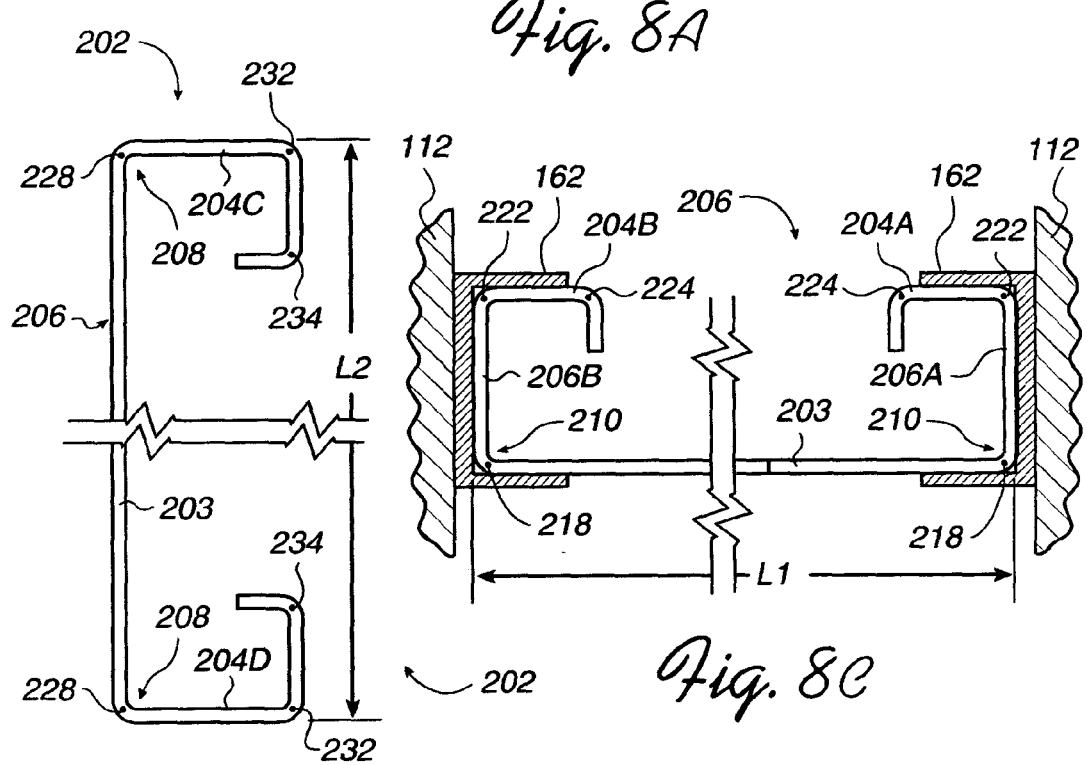
Fig. 8B
Fig. 8C

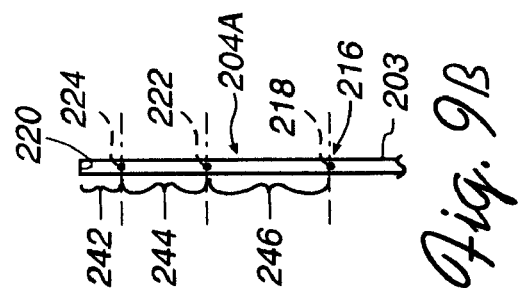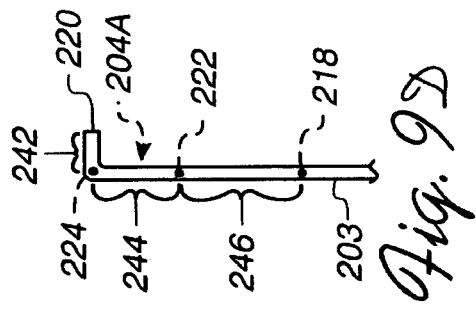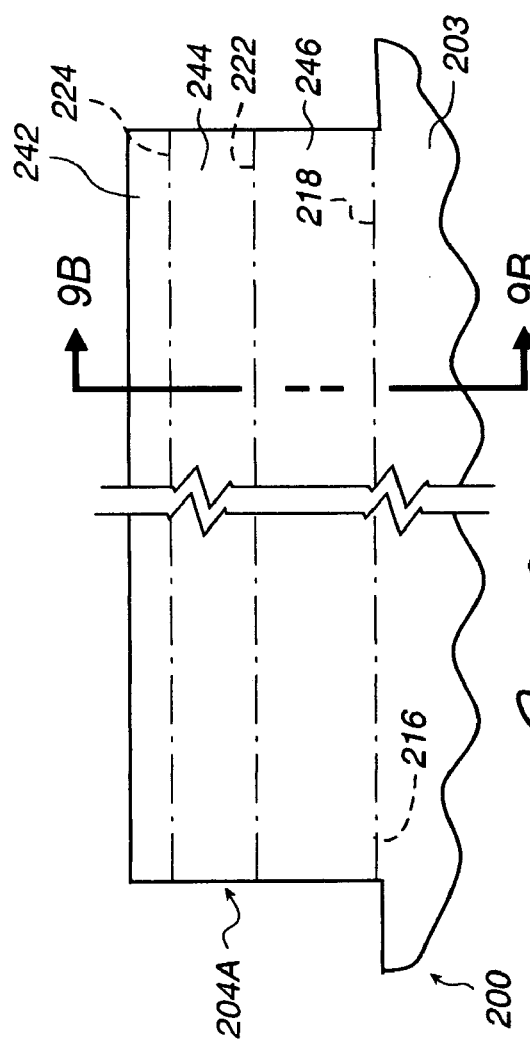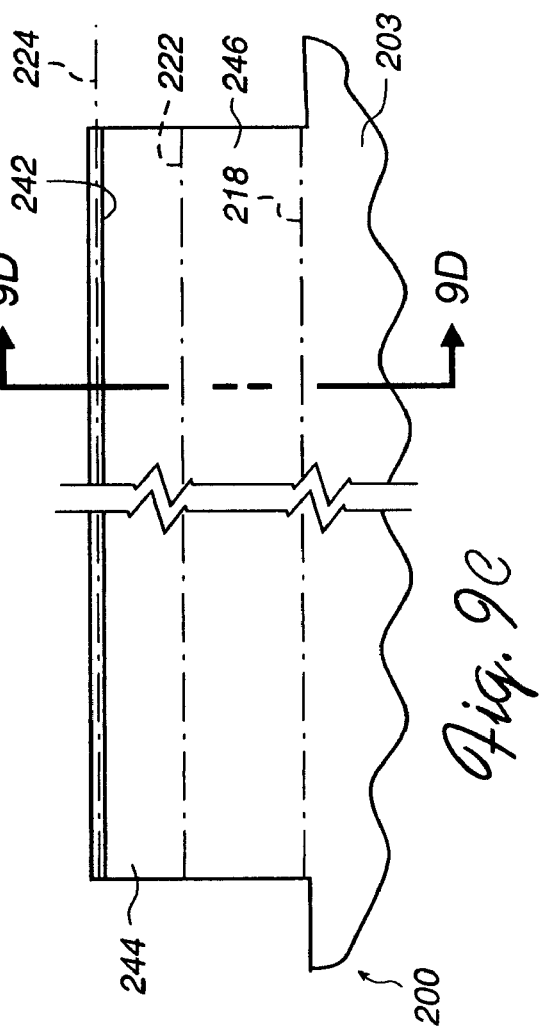

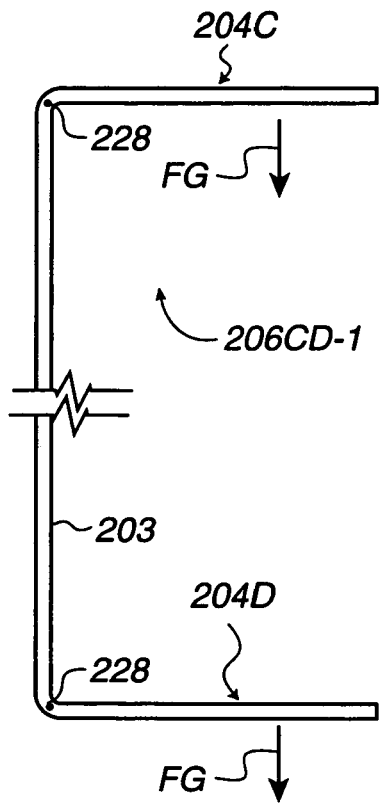
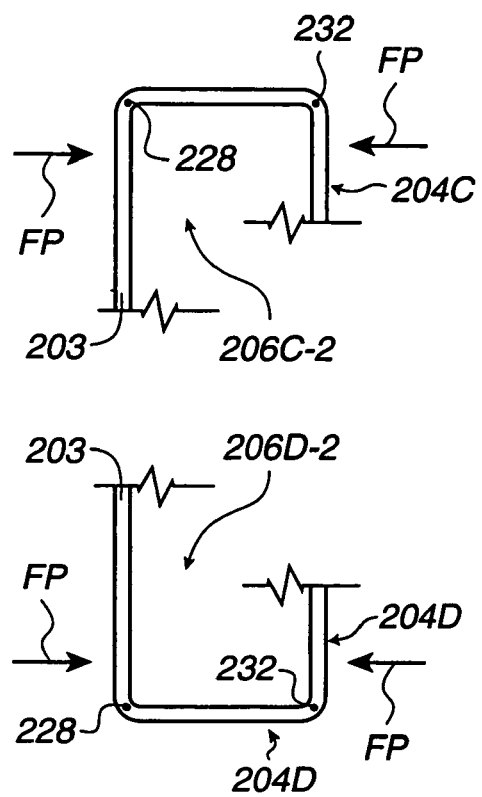
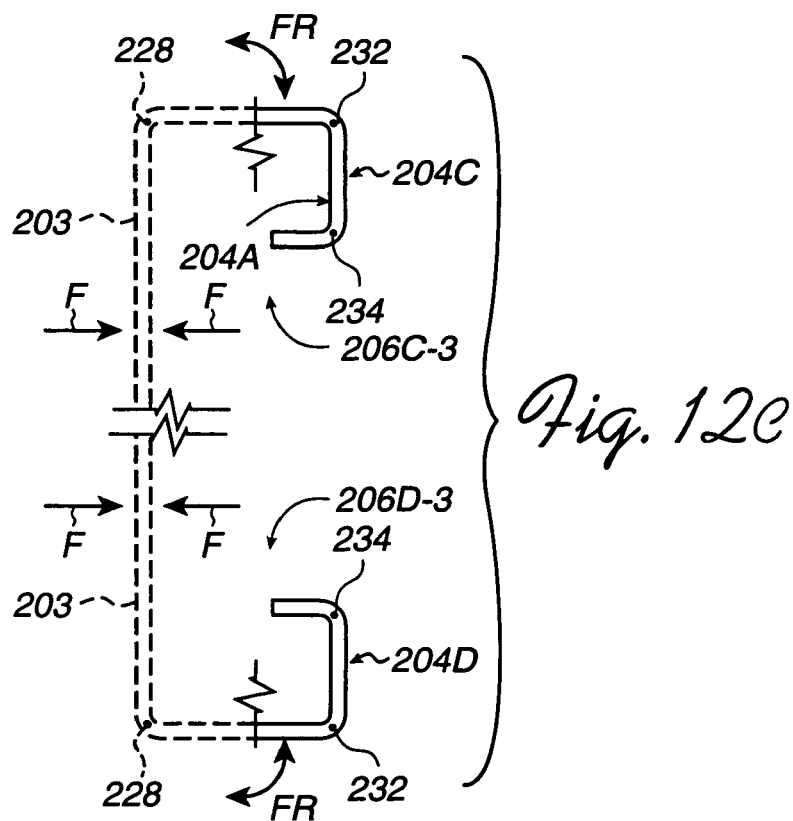
Fig. 12A
Fig. 12B
Fig. 12C

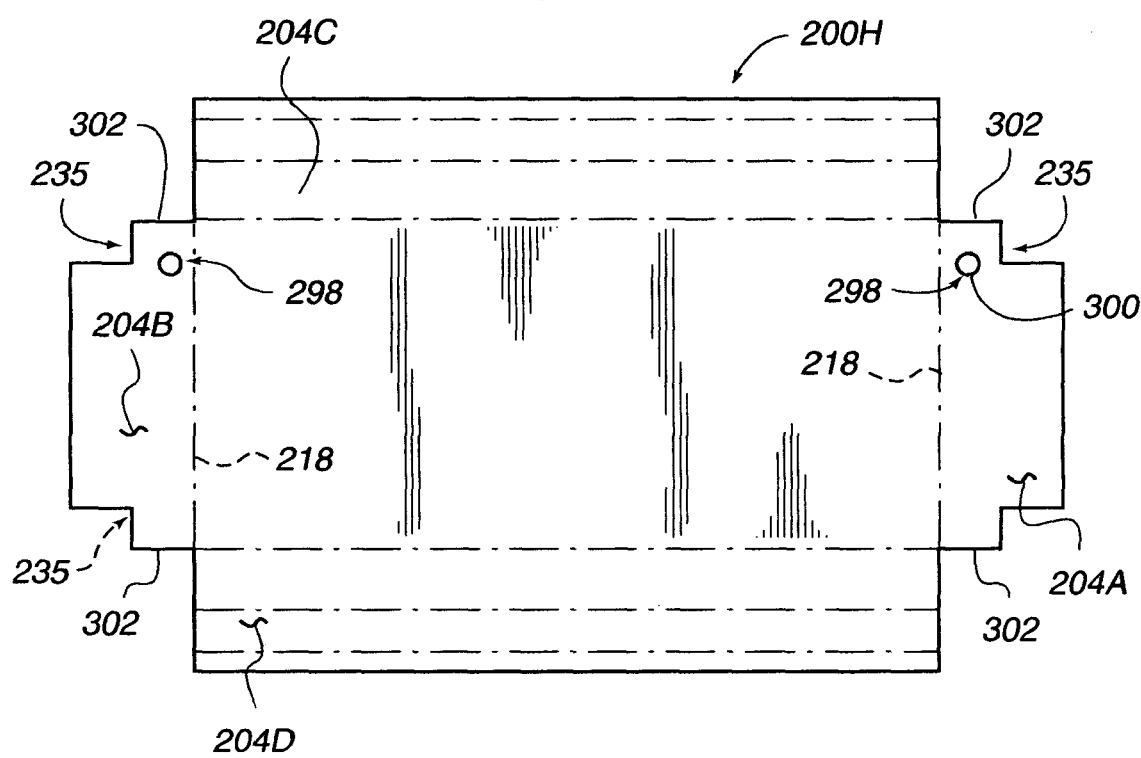

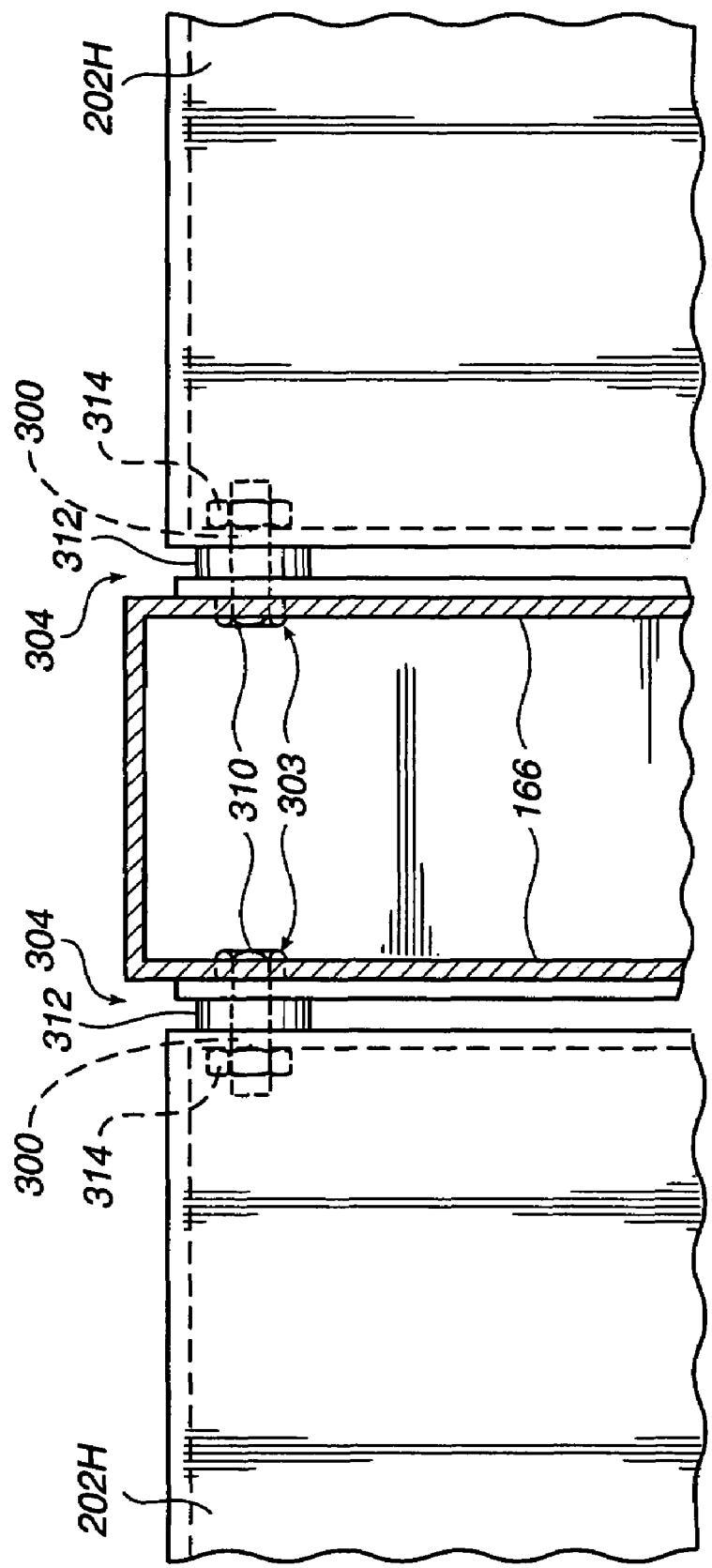

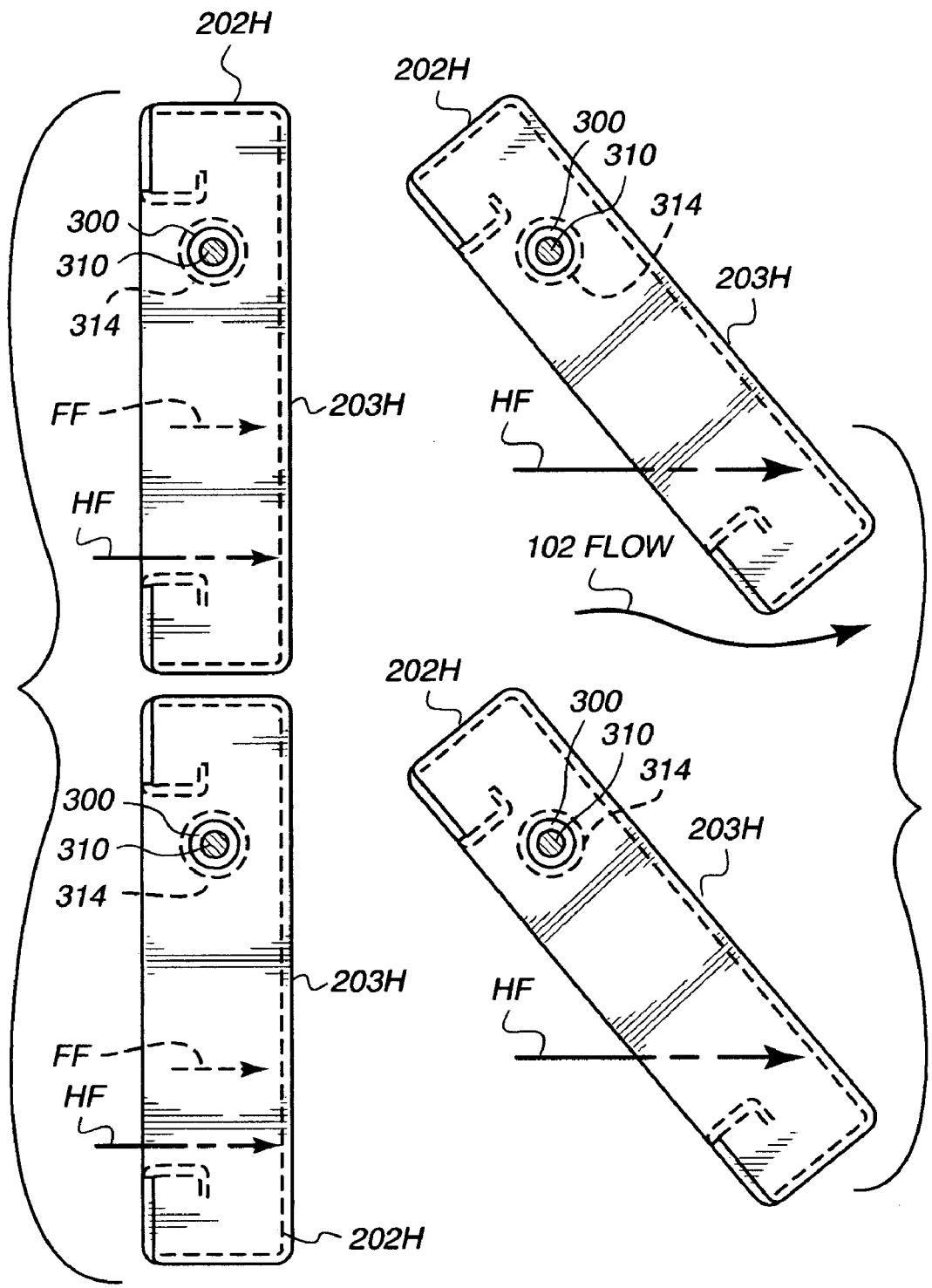
Fig. 22A                    Fig. 22B

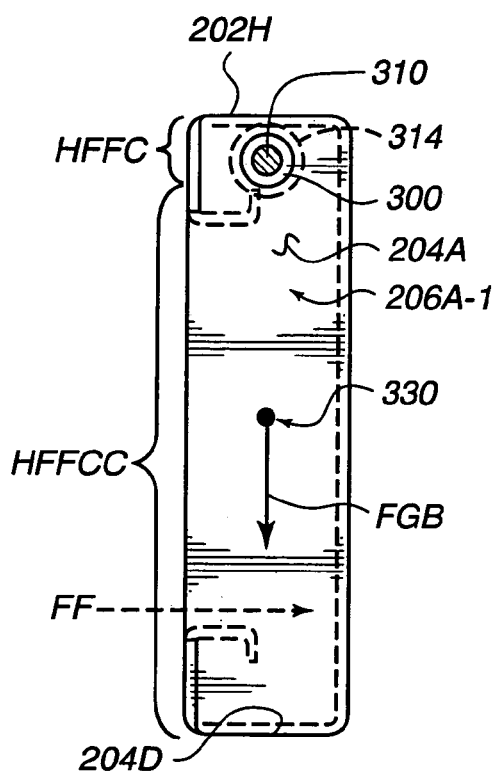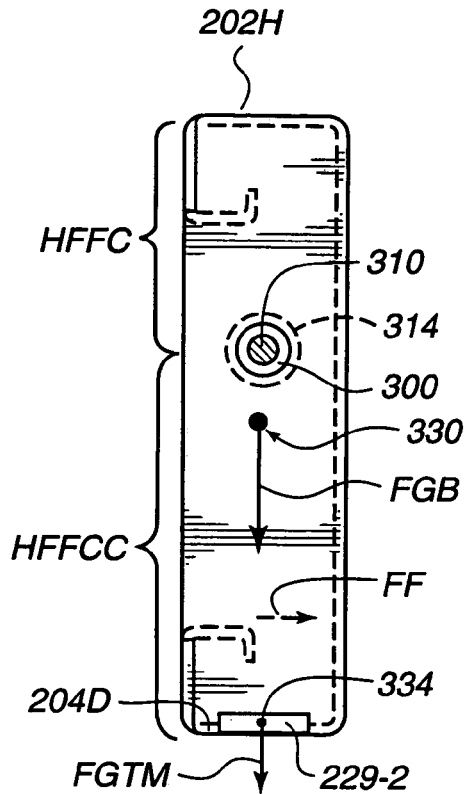
Fig. 23A  Fig. 23B
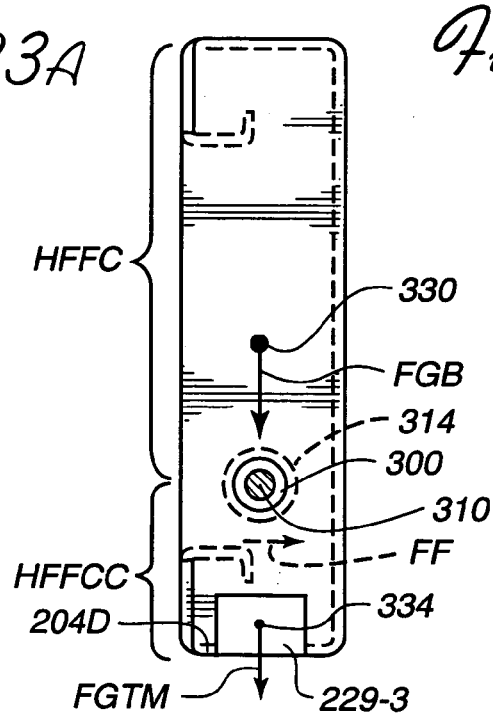
Fig. 23C

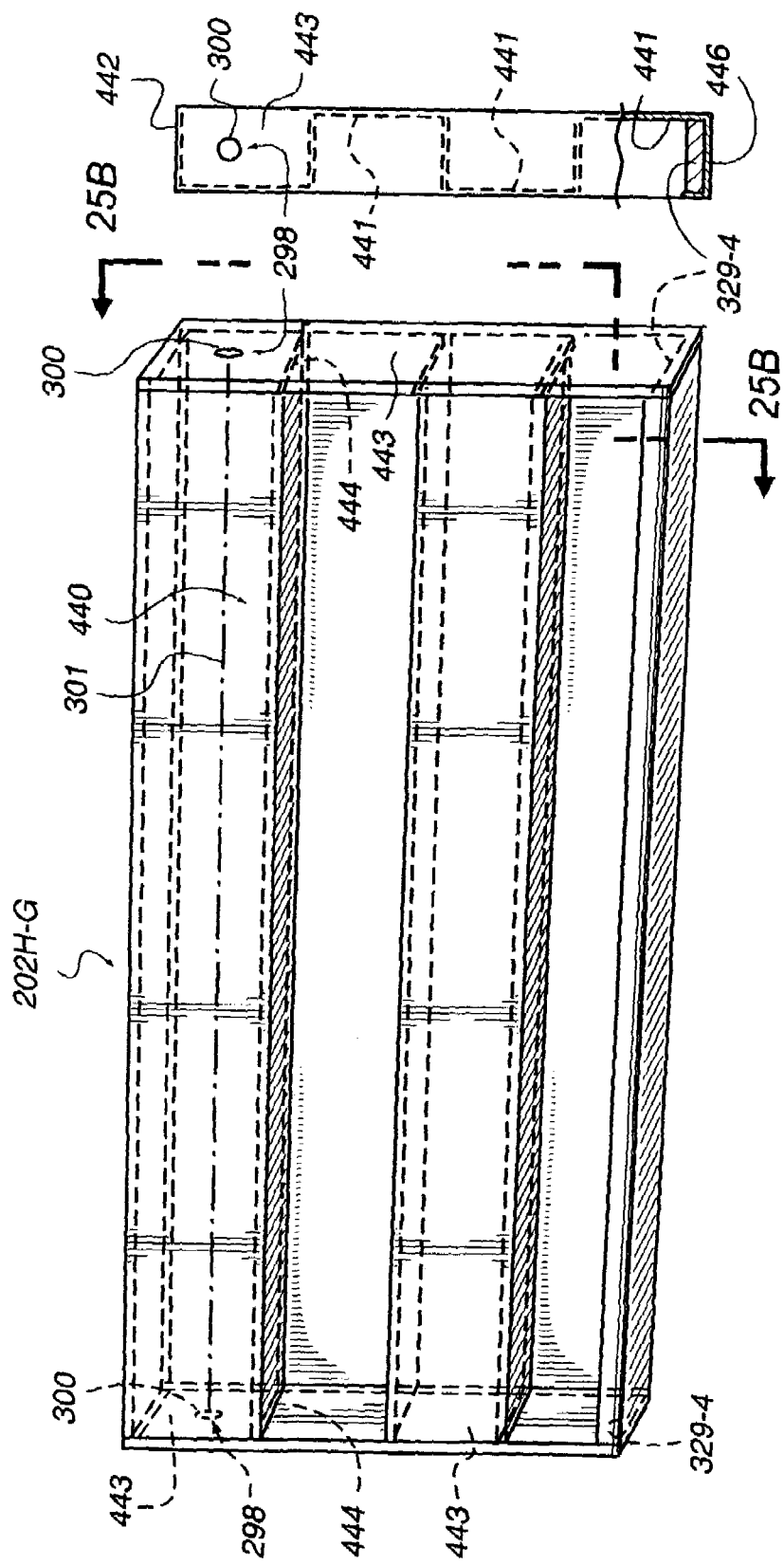

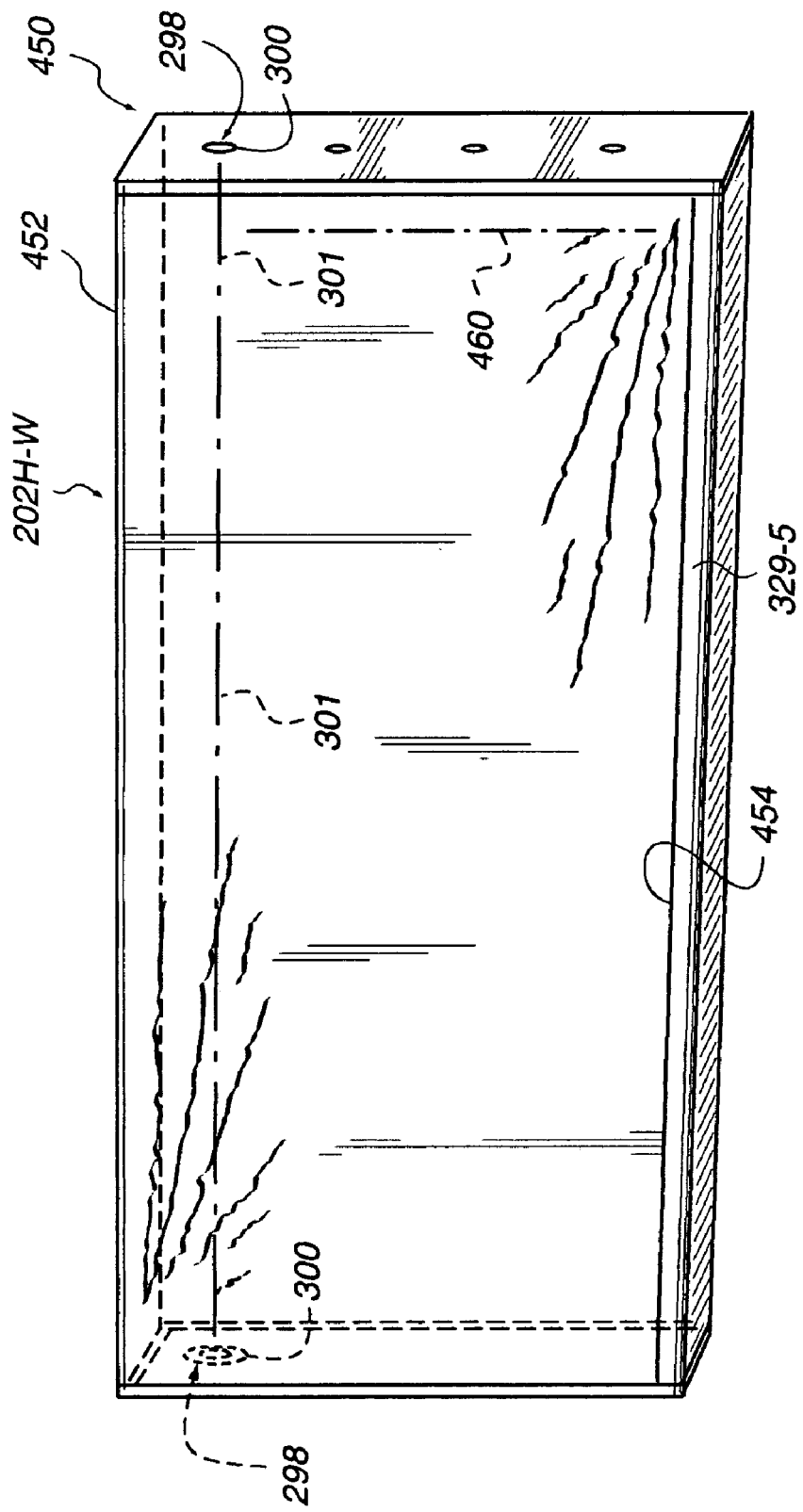

HYDRODYNAMIC-FORCE-RESPONSIVE BAFFLE FOR LIQUID TREATMENT BASIN

CROSS REFERENCE TO RELATED APPLICATION

This application is a continuation-in-part of application Ser. No. 10/154,902 filed May 24, 2002, by C. Lonnie Meurer for Solely-Bent Baffle For Liquid Treatment Basin and Blank For and Method of Making The Baffle (the "Parent Application"). Priority under 35 USC 120 is claimed based on that application Ser. No. 10/154,902, now U.S. Pat. No. 6,783,009. The disclosure of the Parent Application is hereby incorporated by reference.

BACKGROUND OF THE INVENTION

1. Field of the Invention

The present invention relates generally to controlling the flow of liquid in liquid treatment equipment, and more particularly to providing a hydrodynamic-force-responsive baffle for releasing hydrodynamic forces of the liquid in equipment for processing liquid, to methods of providing an unbent baffle blank, and to methods of releasing the hydrodynamic forces imposed on such baffle without breaking the baffle apart, wherein the baffle may have no shape-holding facilities other than bends that form structural channels or beams.

2. Description of the Related Art

Liquid flows into liquid treatment equipment in which the liquid is subjected to various processing operations. The processing operations may be of the contact-type or of a physical-type, for example. The contact-type may include, for example, processes in which the liquid is contacted with a chemical (e.g., for chlorinization or flocculation), or in which the liquid is mixed by energy imparted to the liquid, or in which the liquid is aerated by one or more gasses introduced to the liquid. In each contact process situation, a container 100, such as a three-dimensional container shown in FIGS. 1A and 1B, is provided to receive liquid (see arrows 102) to be processed and to provide a volume in which the contact processing may take place. Chemicals such as chlorine (see arrows 104) may, for example, be supplied to the container 100 from a pipe or other inlet 106. For proper processing, in many cases it is necessary to control the flow of the liquid 102 within the three-dimensional container 100. Such control may be of the direction of the liquid 102, as by using flow controllers, also known as baffles, 110, for example, which may extend between opposed walls 112 of the container 100. The direction of liquid flow may be from an inlet 114 downwardly under a first of the baffles 110-1 (FIG. 1B) and upwardly over a second of the baffles 110-2. Alternatively, FIGS. 2A and 2B show that for processing, baffles 110-3 and 110-4 may extend partially between the walls 112 so as to leave spaces 116 so that the liquid flow is toward one wall 112-1 and then toward the other wall 112-2. For mixing of the liquid 102, FIGS. 2A and 2B show a mechanical mixer 118 between the baffles 110-3 and 110-4. In another variation, the flow rate of the liquid 102 may be controlled as shown in FIGS. 3A and 3B by vertical baffles 110-5 and 110-6 having spaced openings 120, and for example, an aerator 122 may provide gas 124 that contacts the liquid 102. In each illustrated use of the baffles 110, a forward force (see arrows FF) may be applied by the liquid 102 against the baffle 110. The direction of liquid flow may also be reversed. In this case, the flow of liquid 102 that normally exits an outlet 122 may flow (see arrows 124) into the container 100 via the outlet 122 and apply a reverse force (see arrows FR) to the flow controller 110. These forces FF and FR may be described as "normal forces" in that such forces result from customary (or normal) process operations, such as the above-described physical-type or contact-type of process operations.

An example of such physical-type of liquid treatment equipment is a clarifier 130 shown in FIGS. 4A and 4B for removing materials 132 (FIG. 4B) from the liquid 102. These materials 132 are generally in the form of particles suspended in the liquid 102. The particles can be removed from the liquid 102 under the force of gravity when the flow of the liquid 102 is substantially reduced, as in a very low flow rate zone 134 in the clarifier 130. Since these materials 132 are generally solid and are said to "settle" out of the liquid 102, they are referred to as "settleable solids". Such settleable solids 132 may include naturally occurring materials (e.g., clay, silt, sand and dirt), chemical precipitants and biological solids. The word "solids" as used herein to describe the present invention refers to such settleable solids 132. Also, since the settleable solids 132 "settle" out of the liquid 102, the clarifiers 130 are often referred to as "settlers".

Clarifiers 130 are used, for example, to treat liquid 102 in water and waste water treatment plants. In water treatment, the water 102 drawn from a water supply has various non-settleable colloidal solids therein. When mixed with the chemicals 104 (FIG. 4A) in the contact-type of processing, the colloidal solids and chemicals agglomerate to form solids 132. In waste water treatment, the solids include organic solids, among other wastes. Water and waste water may be the liquids 102 treated in the clarifiers 130 to remove such solids 132, thereby making the water clear and suitable for use, reuse, or for further treatment, such as tertiary treatment. The word "liquid" as used herein to describe the present invention refers to water and waste water 102, and to other liquids which may be subjected to the contact-type processes described above. Because of the nature of such use or reuse, during treatment such liquids 102 must not receive any chemicals or other materials that are toxic to humans, for example.

Continuing to refer to the exemplary clarifiers 130, the very low flow rate zones 134 promote maximum settlement of the settleable solids 132 to a bottom 136 of the clarifiers 130. Clarifiers 130 typically include containers 100 (FIG. 4A) that are typically referred to as detention basins where the settlement of the solids 132 occurs. For convenience, the term "basin" as used herein includes such three-dimensional containers 100 and such detention basins 100, and any similar containers (e.g., circular in shape) in which such contact-type or physical-type processing is performed.

Tubes or flat plates 138 mounted at fixed or variable angles relative to the surface of the liquid 102 have been used to form multiple ones of the very low flow rate zones 134 in the detention basins 100. The liquid 102 containing the settleable solids 132 flows into the detention basin 100 and must be directed to the bottom 136 of the basin 100 for flow upwardly in the flow zones 134 at flow rates that generally are slow enough to allow sufficient time for most of the settleable solids 132 to settle out of the liquid 102. As a result, most of the settleable solids 132 will have settled onto the plates or tubes 138 by the time the liquid 102 has flowed to tops 142 of the plates or tubes 138.

In the past, for both the contact-type and the physical-type of processing, liquid 102 flowing into such detention basin 100 for treatment has generally been controlled by providing one of two types of the flow controllers 110 across the opposite, vertically-extending walls 112 of the basin 100. Such incoming liquid 102 generally moves through the inlet 114 of the basin 100, and from the inlet 114 in a forward direction (see arrow 146 in FIG. 4B), generally parallel to the opposite, vertical walls 112. The prior flow controllers 110 extend across the opposed, vertical sides 112 and generally have a height H (FIG. 4B) less than the depth D of the liquid 102 in the basin 100, such that there is a space, or opening, 148 between the bottom 150 of the prior flow controllers 110 and the bottom 136 of the basin 100. The prior flow controllers 110 block the forward flow 146 of the liquid 102 that is above the bottom 150 of the flow controllers 110. However, the opening 148 allows the incoming liquid 102 to flow under the flow controllers 110 and into entrances 152 of the low flow zones 134, the entrances 152 being provided near the bottom 136 of the basin 100.

One type of such prior flow controller 110 is a slab of reinforced concrete generally formed in one piece extending across the opposed walls 112 and providing the opening 148 above the bottom 136 of the basin 100 for forward liquid flow to the entrances 152. The slab is formed by pouring the concrete in place in the basin 100. Over time, the concrete slab of the prior flow controller 110 deteriorates under the action of the incoming liquid 102 and the materials 132 carried by the incoming liquid 102, and must be removed and replaced. Since the concrete slab of the prior flow controller 110 may, for example, be as wide as ten feet, as high as twenty feet, and as thick as eighteen inches, the concrete slab of the prior flow controller 110 is very heavy. As a result, removal of the concrete slab of the prior flow controller 110 both requires use of costly equipment that is time-consuming to use, and increases the risk of injury to the staff that provides maintenance services for the basin 100.

Referring to FIGS. 5A and 5B, in an attempt eliminate the need for such costly equipment, for example, the concrete slabs of the prior flow controllers 110 have been replaced using boards 160 made of redwood. It has been typical for each opposite wall 112 to be provided with a vertically-extending bracket 162, and for the individual redwood boards 160 to be bolted to the brackets 162. Although the redwood boards 160 are easier to install than the concrete slabs, to minimize twisting the boards 160 have typically been made from so-called "clear, all-heart" lumber that is both rare and costly. Further, such redwood boards 160 also require maintenance that involves removal of the boards 160. For example, in use the boards 160 become saturated with the liquid 102 in which the boards 160 are constantly immersed, causing difficulties when attempts are made to remove the boards 160. Each liquid-saturated redwood board 160 is heavy and difficult to lift without use of a mechanical hoist. In an attempt to reduce costs, some have used lesser grades of redwood (other than the "clear, all-heart" grade) to make the boards 160. However, to overcome the decreased quality of the lesser grades, some have improperly treated the lesser-grade redwood boards 160 with arsenic, for example, which is highly toxic and therefore prohibited by applicable regulations for use in liquid 102 intended for human consumption.

FIG. 6 shows how the flow controllers 110 have in the past been provided in the containers 100 when the walls 112 are relatively widely spaced apart, as by twenty feet for example. In this case, separate sections 110S of the flow controller 110 may be provided. For each section 110S, the brackets 162 described with respect to FIG. 5A may be attached to the walls 112, or as shown, a concrete pier 164 may be installed vertically next to the wall 112, and the bracket 162 secured to the pier 164. To allow the boards 160 to be used in standard ten foot lengths for one section 110S, a central pier 166 has been secured by bolts to the bottom 136 (FIG. 4B) of the basin 100 between the walls 112. The pier 166 extends upwardly to provide support in the center of the basin 100. The central piers 166 have been made from stainless steel, for example, and may be secured to brackets 162 in the form of U-shaped slots which receive opposite ends of the boards 160. The boards 160 thus extend horizontally between the brackets 162 and are supported by the central pier 166 against the respective forward and reverse forces FF and FR of the flowing liquid 102. Although the boards 160 may thus be used across such widely spaced walls 112, the boards 160 are still subject to the above-described maintenance problems.

In each above-described use of the baffles 110, the forward force FF and the reverse force FR may be applied by the liquid 102 against the baffles 110. These forces FF and FR are generally applied by the liquid 102 during the normal process operations. As a result, the values of the forces FF and FR are predictable, or controlled. However, additional forces may be applied to the baffles 110 in an uncontrolled manner. The uncontrolled additional forces may result from such naturally-occurring, uncontrolled events as earthquakes, for example. Considering the effects of an earthquake on the prior baffles 110, such as the above-described baffles made of redwood boards, the uncontrolled forces are dynamic, and may be referred to as hydrodynamic forces HF. The hydrodynamic forces HF may include forward hydrodynamic forces HFF and reverse hydrodynamic forces HFR, in that the event may cause the liquid in the basin to have uncontrolled dynamic forward or reverse motion. The magnitude of the forces HFF and HFR is difficult to predict. Thus, it is difficult to design the redwood boards 160 of the baffles 110 to withstand all possible magnitudes of the hydrodynamic forces HFF and HFR. Moreover, it would not be cost-effective to design baffles and related supports (e.g., piers, brackets, etc.) to resist the highest magnitude hydrodynamic forces HFF and HFR. As a result, when standard redwood boards 160 installed in a basin 100 are subject to the hydrodynamic forces HF from an exemplary earthquake of considerable magnitude (e.g. six or more on the Richter scale), the baffles 110 may shatter or otherwise violently break apart. In many cases, the equipment in the basins is somewhat delicate, and is often severely damaged by the broken redwood boards 160. For example, heads of the aerator 122 (that emit gases into the liquid in the basin) may be damaged and rendered useless. Therefore, significant maintenance may be required immediately after an earthquake, which often results in lengthy shutdown of the equipment in the basins.

Therefore, what is needed is a way of providing an improved flow controller, or baffle, for use in liquid treatment equipment. In particular, what is needed is an improved flow controller that is not subject to being shattered or broken in response to the hydrodynamic forces HF. Further, such a baffle should not require immediate post-earthquake maintenance before normally functioning once again to block the normal flow of the liquid having the normal forces FF and FR. Still further, what is needed is a way to retrofit existing redwood baffles to render such baffles no longer subject to being shattered or broken in response to the hydrodynamic forces HF. In addition, what is needed is a way to fill these needs in baffles made from various materials.

SUMMARY OF THE INVENTION

Broadly speaking, the present invention fills these needs by providing a flow controller, referred to below as a "baffle", wherein the baffle is not subject to being shattered or broken in response to the hydrodynamic forces HF. The baffle preferably has no shape-holding facilities other than bends that define and hold the shape, or configuration, of structural channels. Also, the baffle may control the flow of the liquid in any of the above-described liquid treatment equipment, e.g., for the contact-type or the physical-type of processes. The present invention also fills these needs through methods of providing an unbent blank for making such baffle.

In one embodiment, the present invention fills these needs by providing a preferably stainless steel unbent baffle blank that may be deformed by bending into a configuration that defines a plurality of structural channels of a baffle, wherein the deformed blank need not be held bent in such configuration by any fastener or welding, for example, and wherein the plurality of structural channels render the baffle able to withstand the various respective forces FF and FR, for example, applied to the baffle by the respective incoming liquid and by liquid having a reverse flow direction in the basin, and wherein one of the plurality of structural channels is configured to render the baffle able to withstand the uncontrolled hydrodynamic forces HF, for example, applied to the baffle during an event such as an earthquake. Such bent baffle (that is not welded or fastened or otherwise secured in the desired bent configuration) is thus referred to as a "soley-bent" baffle to indicate, or describe, the structural characteristic of only being bent into a configuration implementing the desired plurality of structural channels, and to indicate, or describe, the structural characteristic of staying in such bent configuration without being retained in such configuration by welds or fasteners, or by any other structure added to the bent material from which the blank baffle is made. Additionally, the solely-bent baffle may not only have the above-described characteristics, and not only may be configured to withstand the hydrodynamic forces HF without being shattered or broken in response to such hydrodynamic forces HF, but such a baffle does not require immediate post-earthquake maintenance before normally functioning once again to block the normal flow of the liquid having the forces FF and FR.

The present invention also solves these needs by providing another embodiment of a flow controller such as a baffle for releasably blocking a portion of a flow of liquid in a flow path defined by a closed perimeter. A rigid self-supporting panel is configured to overlap a portion of the closed perimeter. The panel may be provided with a first hinge member configured to mount the panel in a normal process orientation overlapping the closed perimeter to substantially block the flow path. The first hinge member may further be configured to allow the panel to move partially from the normal orientation to release the flow of the liquid. The panel may be further configured with a torque member to define an amount of a force of the flow of the liquid to be substantially blocked by the panel and an amount of a hydrodynamic force of the flow of the liquid to be released by the panel so that the panel is not subject to being shattered or broken in response to the hydrodynamic force. This embodiment fills the need to avoid being shattered or broken in response to the hydrodynamic forces HF in baffles made from various materials.

The present invention also solves these needs by a method of releasing the hydrodynamic flow of liquid in a basin by controlling a baffle. The method includes an operation of mounting the baffle for movement relative to a vertical orientation. Another operation urges the baffle to remain substantially in the vertical orientation in response to normal process forces. Another operation allows the urging operation to be overcome by a hydrodynamic force that moves the baffle substantially from the vertical orientation. Another aspect of the method of the present invention includes a further operation of continuing the urging operation to restore the baffle to the vertical orientation after cessation of the hydrodynamic force.

Other aspects and advantages of the invention will become apparent from the following detailed description, taken in conjunction with the accompanying drawings, illustrating by way of example the principles of the present invention.

BRIEF DESCRIPTION OF THE DRAWINGS

The present invention will be readily understood by the following detailed description in conjunction with the accompanying drawings, in which like reference numerals designate like structural elements.

FIG. 8A is a perspective view illustrating tabs of the blank, wherein the tabs are bent to form the first embodiment of the baffle of the present invention having soley-bent structural channels;

FIG. 8B is a cross-sectional view taken along line 8B—8B in FIG. 8A, illustrating two opposed side tabs and the blank defining five of the structural channels of the baffle;

FIG. 8C is a cross-sectional view taken along line 8C—8C in FIG. 8A, illustrating two opposed end tabs and the blank defining five of the structural channels of the baffle;

FIGS. 9A through 9H depict an end tab in successive stages of being bent to form a plurality of the soley-bent channels;

FIGS. 12A, 12B, and 12C are cross-sectional views of the side tabs similar to the end tabs shown in FIGS. 8D, 8E, and 8F, showing forces applied to the first embodiment of the baffle, wherein such baffle resists the forces;

FIG. 19 illustrates a cross sectional view taken along line 19—19 in FIG. 18, illustrating a bushing between one flat bar and the baffle;

FIG. 22A is a cross sectional view illustrating the relative vertical positioning of two adjacent baffles when the hydrodynamic forces have a relatively low value;

FIG. 22B is a cross sectional view of the two adjacent baffles illustrating how the hydrodynamic forces having a high value have tilted, or pivoted, the baffles on the hinge members to relieve the hydrodynamic forces;

FIGS. 23A, 23B, 23C are elevational end views of three embodiments of the baffle of FIG. 16, illustrating three different locations of the hinge members, and showing three different configurations of torque members for restoring the respective baffles to a vertical position after being tilted by the hydrodynamic forces;

FIGS. 25A, 25B, and 25C illustrate embodiments of the baffle of the present invention in which materials other than stainless steel may be used to fabricate the baffles.

DETAILED DESCRIPTION OF THE PREFERRED EMBODIMENTS

An invention is described for assuring flow control in a basin both in normal and in uncontrolled abnormal situations, and for filling the above-described needs by providing a baffle for, and methods of, releasing hydrodynamic forces imposed on a baffle without breaking the baffle apart. An embodiment of a baffle may have no configuration-holding, or shape-holding, facilities other than bends that define and hold the shape, or configuration, of structural channels. The present invention also fills such needs by providing methods for forming unbent blanks for making such baffles. The present invention also fills such needs by providing the method of releasing the hydrodynamic forces imposed on the baffle without breaking the baffle apart, and by not requiring immediate post-earthquake maintenance before normally functioning once again to block the normal flow of the liquid having the forces FF and FR. It will be obvious, however, to one skilled in the art, that the present invention may be practiced without some or all of these specific details. In other instances, well known process operations have not been described in detail in order not to obscure the present invention.

Figure 7A:
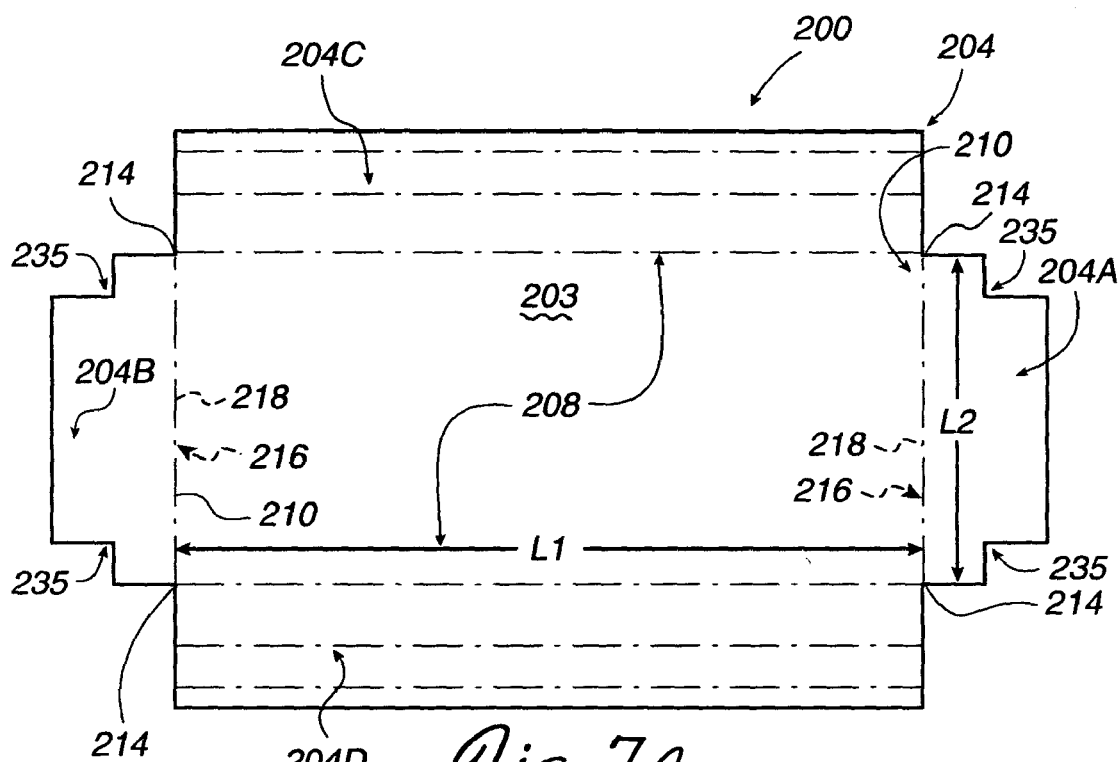
FIGS. 7A, 7B and 7C illustrate a blank of the present invention for making a first embodiment of baffle of the present invention having soley-bent structural channels.
Figure 7B:
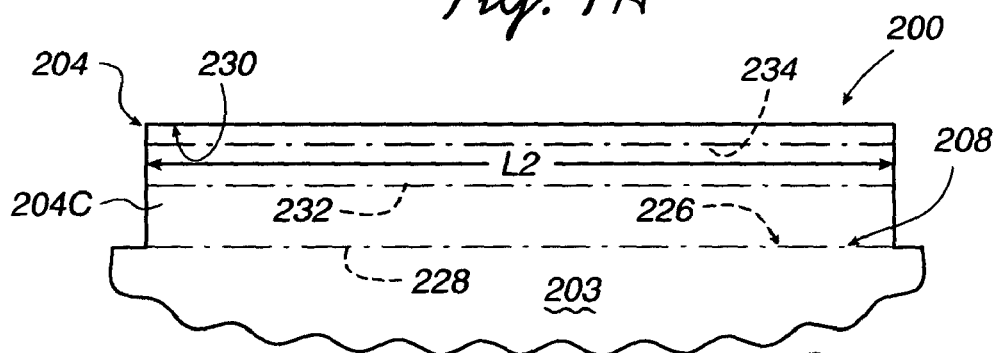
Figure 7C:
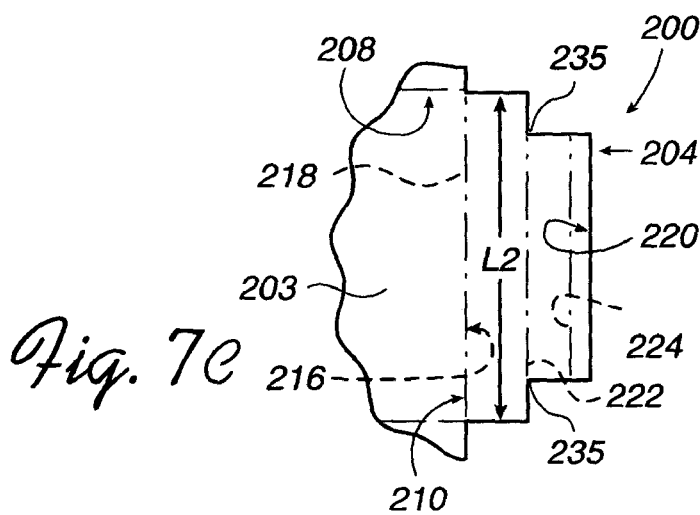

FIGS. 7A through 7C show one embodiment of the present invention in the form of a blank 200 of material for forming a first embodiment of a baffle 202 (FIGS. 8A and 8B), wherein the baffle 202 is configured to resist the forces FF and FR applied by the liquid 102 to the baffle 202 during normal process operations. The blank 200 is configured with a central sheet 203 and a plurality of channel tabs 204 (FIGS. 7A and 7B) to facilitate fabrication into the baffle 202. An exemplary four channel tabs 204 (shown as tabs 204A through 204D) may be provided integral with the sheet 203. FIGS. 8A and 8B show the baffle 202 with each of the tabs 204A through 204D having been bent into a configuration characterized by a plurality of structural channels 206 along each of opposite sides 208 (FIG. 7A) and each of opposite ends 210 (FIG. 7A) of the sheet 203. The structural channels 206 adapt the baffle 202 to withstand the plurality of forces F and FR (FIGS. 12A through 12C), for example, which may be applied to the baffle 202 during use in the above-described basins 100, for example.

The blank 200 is shown in FIGS. 7A through 7C including the sheet 203 fabricated from a particular material, such as stainless steel. Although stainless steel is the preferred material due to its resistance to corrosion, for example, the blank 200 may be made from other materials, such as aluminum, or bendable plastic, e.g., plastic that can bend and hold a set (a bent shape), such as mechanical ABS. When the sheet 203 is configured from stainless steel, type T304 stainless steel having a thickness of 0.03 inches, for example, may be used. The sheet 203 has the opposite sides 208 that are identified by dash-dot-dash lines to indicate that the sides 208 may correspond to, or be the site of, bends, as is more fully described below. The sides 208 are configured with substantially equal first lengths L1 that may correspond to the width W of one of the above-described sections 110-1. Such width W, and thus such first length L1, may be in the range of from one foot to about ten feet, for example. Thus, when installed in the basin 100 in place of the prior ten foot boards 160 (FIG. 6), the baffle 202 will extend across the basin 100 completely between the opposite walls 112, or completely between the bracket, or slots, 162 of a section 110S, for example.

Figure 3A:
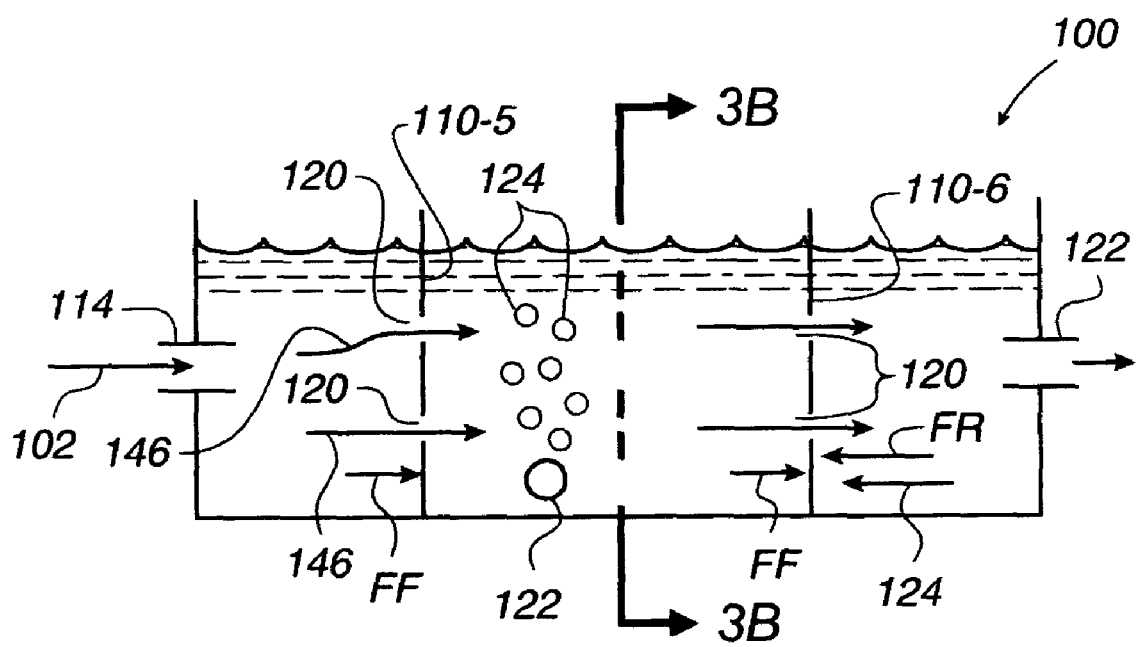
Figure 3B:
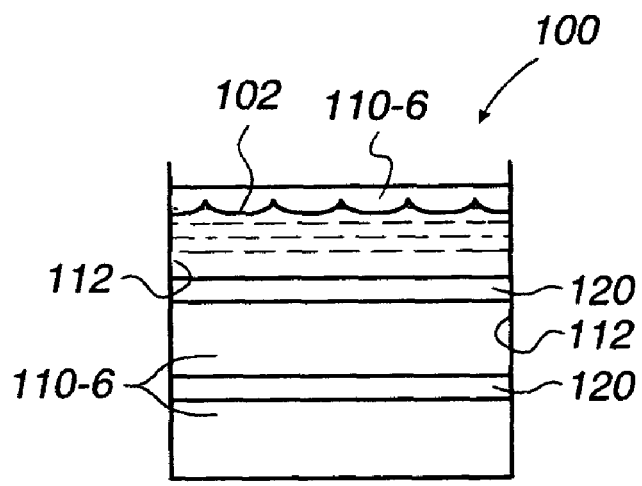
Figure 4A:
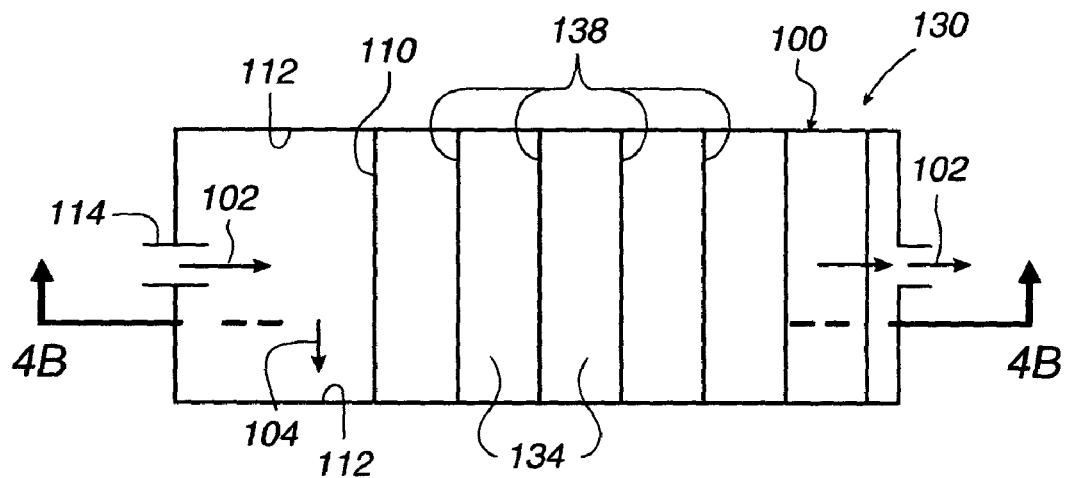
Figure 4B:
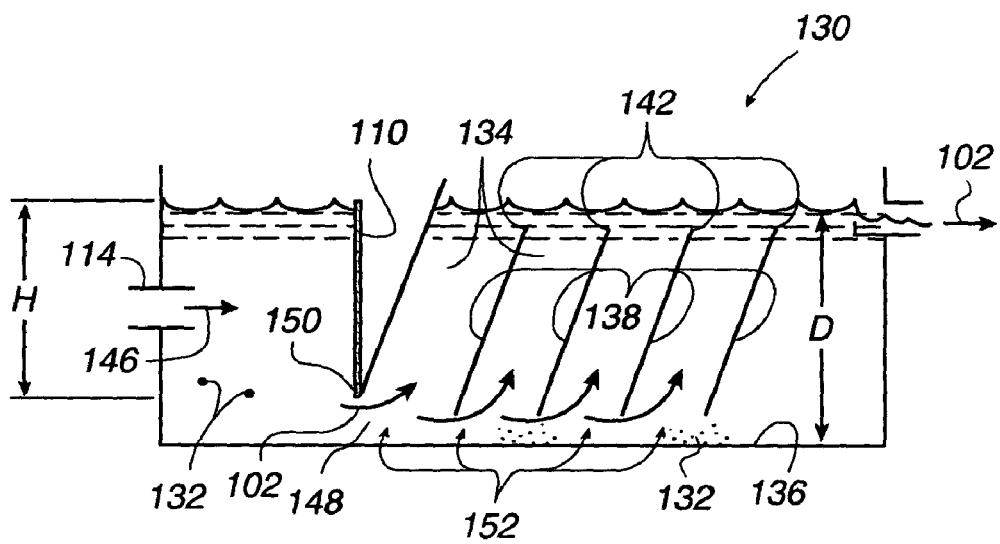
Figure 5A:
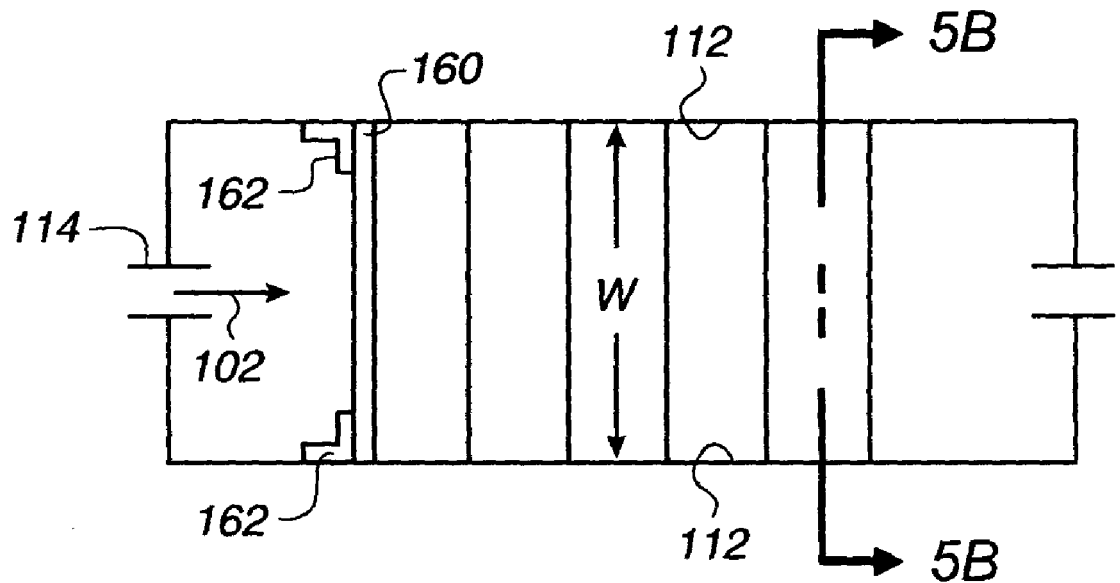
Figure 5B:
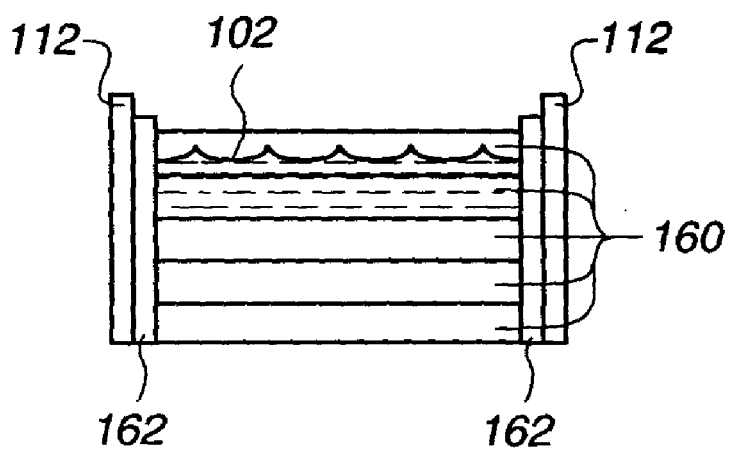

The sheet 203 is also configured with the opposite ends 210 that are also identified by dash-dot-dash lines to again indicate that the ends 210 may correspond to, or be the site of, bends, as more fully described below. The opposite ends 210 are configured with substantially equal second lengths L2. The second lengths L2 may individually be in a range of inches to about three feet, for example. Many of the baffles 202 may be arranged vertically, one above the other, with the bent tabs 204A and 204B in the slots 162 and may in combination have a height corresponding to the height H (FIG. 4B) of one of the flow controllers 110 that is used to block flow of liquid 102 in a section 110-1, for example. Thus, when many of the baffles 202 are installed in a basin 100 one above the other in place of the boards 160 (FIG. 6), the many baffles 202 and any spaced openings 120 (FIG. 3B) will in combination have the desired height H, which may be up to twenty feet, for example.

FIG. 7A shows that each adjacent one of the sides 208 and ends 210 are configured in perpendicular relationship and intersect to define a corner 214 of the blank 200. The blank 200 is configured with first, second, third and fourth ones of the corners 214. As described above, then, one configuration of the sheet 203 with the sides 208 and the ends 210 is a rectangular configuration. Depending on the values of L1 and L2, another configuration of the sheet 203 may be square, for example. The values of L1 and L2 may be selected according to the values of the width W and the height H of the basin 100, or of a section 110-1, for example, of a basin 100.

Regardless of the dimensional configuration of the sides 208 and of the ends 210 of the sheet 203, the sheet 203 is also configured with the plurality of the channel tabs 204A and 204B. For purposes of description, the channel tab 204A is identified as a first channel tab, and the opposing channel tab 204B is referred to as a second channel tab. As shown in FIG. 7C, the tab 204A is configured with a first proximal edge 216 integral with one of the ends 210. The tab 204B is similarly configured integral with the other end 210. These tabs 204A and 204B may be referred to as "end tabs". Each of the first proximal edges 216 is coextensive with the respective end 210 of the blank 200, and is coextensive with a first axis 218, which may be referred to as an axis of bending, or bend axis, as described below. Each respective first and second tab 204A and 204B is configured to extend from the respective coextensive end 210 and first proximate edge 216 to a first distal edge 220 that is opposite to and parallel with the respective first proximal edge 216. Each respective first and second channel tab 204A and 204B is further configured with respective second and third axes 222 and 224. Each of the second and third axes 222 and 224 is parallel to the respective first axis 218 and is located between the respective first proximal edge 216 and the respective first distal edge 220. The second channel tab 204B is configured as a mirror image of the first tab 204A. With each of the tabs 204A and 204B integral with the sheet 203, each of the tabs 204A and 204B is fabricated from the same particular material as is used to make the sheet 203.

Regardless of the configuration of the sides 208 and ends 210 of the sheet 203, FIGS. 7A and 7B also show that the sheet 203 is also configured with the channel tabs 204C and 204D, which for purposes of description are referred to as respective third and fourth channel tabs 204C and 204D. In the detail of FIG. 7C, each of the third and fourth channel tabs 204C and 204D is configured with a second proximal side 226 integral with a different one of the sides 208 along a fourth axis 228, which may also be referred to as an axis of bending, or bend axis, as described below. Each of the third and fourth channel tabs 204C and 204D may be referred to as a "side tab". Each of the third and fourth channel tabs 204C and 204D is configured with a second distal side 230 opposite to and parallel with the respective second proximal side 226. Each of the third and fourth channel tabs 204C and 204D is configured with respective fifth and sixth axes 232 and 234, each of which is parallel to the respective fourth axis 228 and perpendicular to the third axis 224, and is located between the respective second proximal side 226 and the respective second distal side 230.

The distance between the proximal edge 216 and the distal edge 220, and the distance between the proximal side 226 and the distal side 230, will depend on the desired structural characteristics of the plurality of structural channels 206. In a preferred embodiment of the baffle 202, these distances may be three inches, for example. The distance between the distal edge 220 and the third axis 224 may be one-half inch, for example. The distance between the third axis 224 and the second axis 222 may be one inch, for example. The distance between the second axis 222 and the proximal edge 216 may be one and one-half inches, for example. The distance between the distal side 230 and the third axis 234 may be one-half inch, for example. The distance between the third axis 234 and the second axis 232 may be one inch, for example. The distance between the second axis 232 and the proximal side 226 may be one and one-half inches, for example.

Figure 8D:
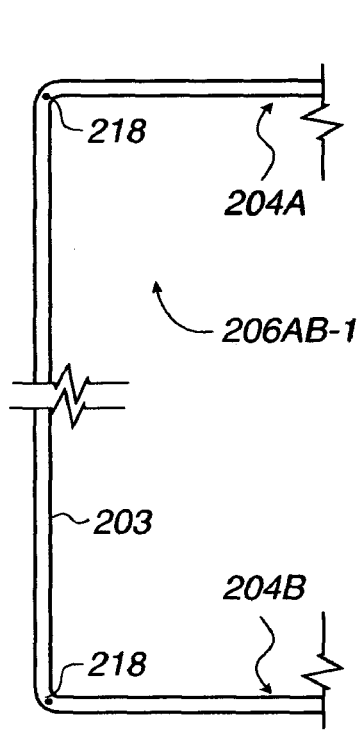
FIGS. 8D, 8E and 8F depict portions of the baffle shown in FIG. 8C to separately show the five channels.
Figures 8E, 8F:
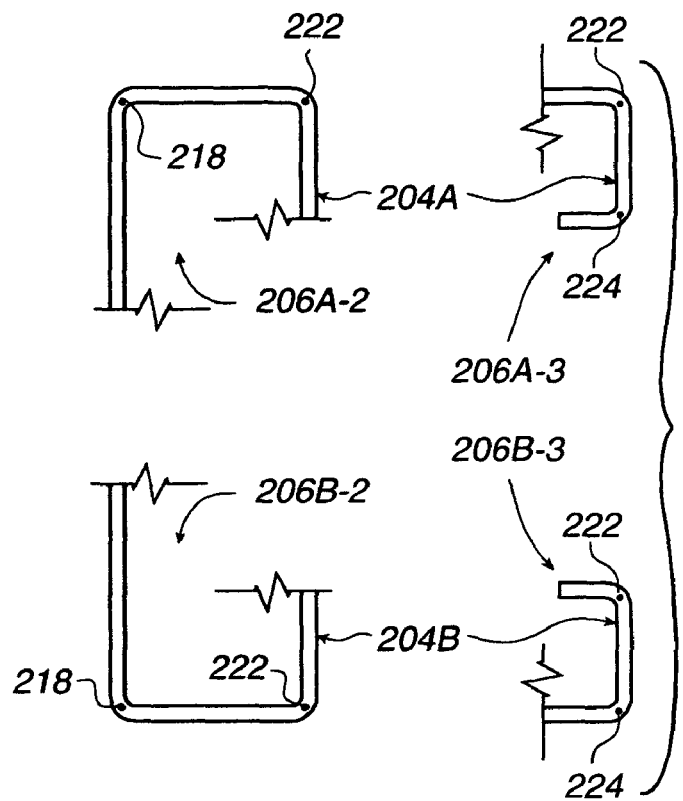
Figure 8G:
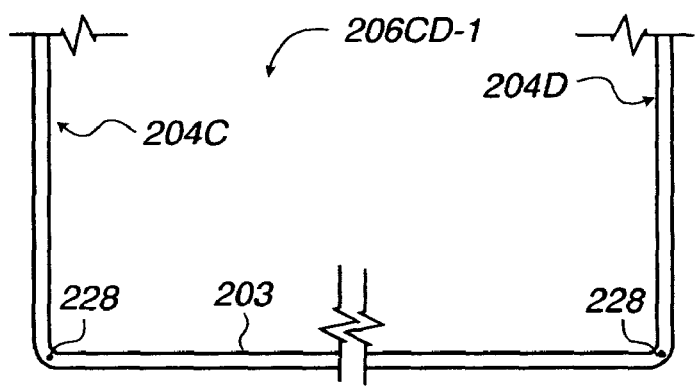
FIGS. 8G, 8H and 8I depict portions of the baffle shown in FIG. 8B to separately show the five channels.

FIGS. 8A through 8I illustrate that by being configured with the above-described thickness, distances and material, for example, the integral sheet 203 and channel tabs 204A through 204D integral with the sheet 203, are configured to be bent, or to bend, along each of the respective first, second, third, fourth, fifth, and sixth axes 218, 222, 224, 228, 232, and 234 to define a plurality of the structural channels 206. Such structural channels are referred to collectively using the reference number 206. An exemplary first one of the structural channels is configured using both of the end tabs 204A and 204B, thus, the structural channel reference number 206AB-1 is used to identify the first structural channel (FIG. 8D). A second structural channel 206 may be configured using one such integral channel tab 204 and the sheet 203. An example is the individual channel tab 204A shown in FIG. 8E, and the sheet 203. The resulting second structural channel is referred to as the channel 206A-2 (FIG. 8E) to identify the second one of such structural channels configured from the "A" channel tab 204A and the sheet 203. The structural channel reference number 206A-3 (FIG. 8F) identifies a third one of such channels configured from the "A" tab 204A and the sheet 203. The reference numbers 206B-2 and 206B-3 refer to corresponding channels configured using the "B" tab 204B.

Another exemplary "first" one of the structural channels may be configured using both of the side tabs 204C and 204D and the sheet 203, thus the structural channel reference number 206CD-1 (FIG. 8G) is used to identify the different first structural channel configured using both of such side tabs 204C and 204D. Another structural channel 206 may be provided in conjunction with one such integral channel tab 204 and the sheet 203. For example, the tab may be the individual side channel tab 204C, and the resulting structural channel is referred to as the channel 206C-2 (FIG. 8H) to identify a second one of such structural channels configured from the "C" channel tab 204C. The structural channel reference number 206C-3 (FIG. 8I) identifies a third one of such structural channels configured from the "C" tab 204C. The reference numbers 206D-2 and 206D-3 refer to corresponding channels configured using the "D" tab 204B.

With the various structural channels 206 in mind, by reference to FIGS. 8B and 8C it may be appreciated that the overall configuration of the sheet 203 and the respective tabs 204A and 204B (FIG. 8C), and the overall configuration of the sheet 203 and the respective tabs 204C and 204D (FIG. 8B), is a convoluted configuration in that the bent tabs 204 are coiled up, with the sheet 203 being flat, and the respective tabs 204 being flat between the respective axes 218, 222, and 224 (FIG. 8C), and the respective tabs 204 being flat between the respective axes 228, 232, and 234 (FIG. 8B).

Also, when FIG. 8B is rotated clockwise ninety degrees it may be appreciated that the overall configurations of the bent respective tabs 204C and 204D are respectfully J-shaped and reverse J-shaped. Similarly, when FIG. 8C is rotated clockwise one hundred eighty degrees it may be appreciated that the overall configurations of the bent respective tabs 204B and 204A are respectfully J-shaped and reverse J-shaped.

FIGS. 7A and 7C show that to facilitate such bending, a first embodiment of notches 235 may be provided in the tabs 204. In general, in this embodiment one notch 235 may be provided in one of a side tab (e.g., 204C) or as shown in FIG. 7A, in one of the end tabs that is adjacent to the one side tab (e.g., the end tab 204A). Thus, at each corner 214 of the sheet 203, one notch 235 may be provided in the side tab 204 or in the end tab 204 that is adjacent to the side tab 204. While each of the first and second end channel tabs 204A or 204B may be so provided with the notches 235, as another example of how the notches 235 may be configured, FIGS. 7A and 7C show exemplary opposed notches 235 configured in each of the first and second end channel tabs 204A and 204B. These exemplary notches 235 allow the respective bent third and fourth channel tabs 204C and 204D to cooperate in a desired manner with the other respective bent first and second channel tabs 204A and 204B. The desired cooperation provided by these exemplary notches 235 is to allow the respective first and second channel tabs 204A and 204B to be bent along the respective axis 218, 222, and 224 without interfering with the previously respective bent third and fourth channel tabs 204C or 204D. As another example, when the notches 235 are provided in the side channel tabs 204C and 204D, such notches 235 allow the respective first and second channel tabs 204A and 204B to cooperate with the other respective bent third and fourth channel tabs 204C and 204D in a similar manner. The desired cooperation provided by the notches 235 is to allow the respective first and second channel tabs 204A and 204B to be bent along the respective axis 218, 222, and 224 without interfering with the respective bent third and fourth channel tabs 204C or 204D.

As shown in more detail in FIGS. 9A through 9H, in a preferred embodiment of the present invention the exemplary four tabs 204A, 204B, 204C, and 204D may be configured so that the structural channels 206 configured using corresponding ones of the tabs 204 are of uniform and generally similar size and configuration. In this regard, it may be appreciated that one particular structural channel 206 may be configured from less than all of a particular one of the tabs 204, and that a different particular structural channel 206 may be configured from a portion of a particular one of the tabs 204 and from a portion of the sheet 203, for example. For example, FIGS. 8D, 8E, and 8F collectively depict five structural channels 206 that have been configured from the one sheet 203 and from the two tabs 204A and 204B shown in FIG. 8C. Similarly, FIGS. 8G, 8H, and 8I collectively depict five structural channels 206 that have been configured from the one sheet 203 and the two tabs 204C and 204D shown in FIG. 8B.

Figure 8H:
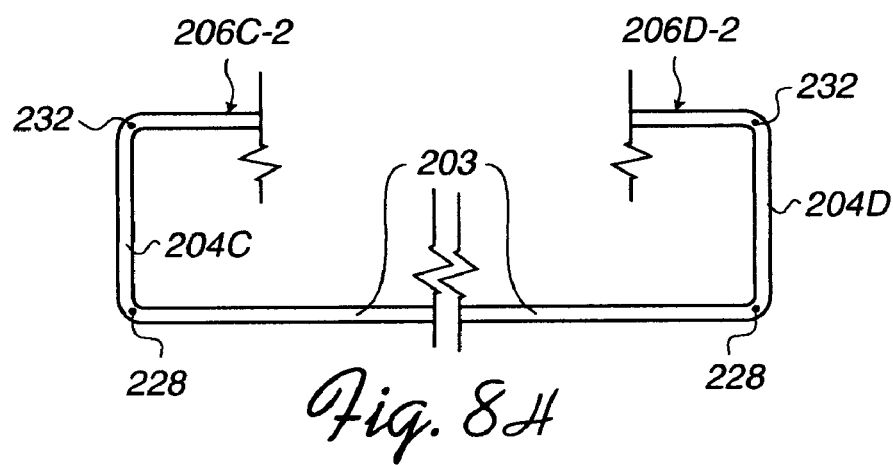
Figure 8I:
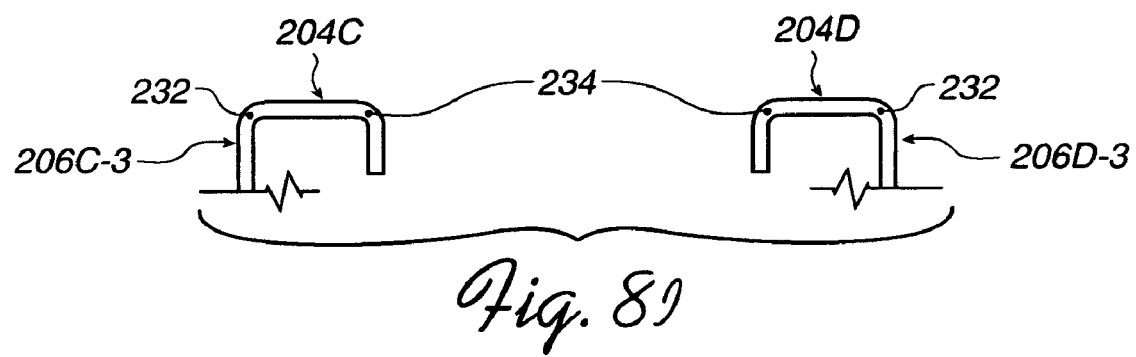

In more detail, the first structural channel 206AB-1 (FIG. 8D) is of generally similar size and configuration as the first structural channel 206CD-1 (FIG. 8G), except for the lengths L1 and L2. Also, the second structural channel 206A-2 (FIG. 8E) is of generally similar size and configuration as each of the second structural channels 206B-2 (FIG. 8E) and 206C-2 and 206D-2 (FIG. 8H). Similarly, the third structural channel 206A-3 (FIG. 8F) is of generally similar size and configuration as each of the third structural channels 206B-3 (FIG. 8F) and 206C-3 and 206D-3 (FIG. 8I).

A method of the present invention may be provided for fabricating the blank 200. The method is shown in conjunction with FIGS. 7A through 7C and with reference to the flow chart 236 shown in FIG. 10A. The method starts with an operation 237 of providing the baffle blank 200 as described above with respect to FIGS. 7A through 7C. The blank 200 is in the form of the sheet 203 having the dimensions L1 and L2 (FIG. 7A) and is fabricated from the selected material. The method moves to operation 238 in which the tabs 204 are provided integral with the sheet 203. The sheet 203 and the tabs 204 may be integral by being cut out, or stamped, from the same piece of the material. The method then moves to an operation 239 in which, for each structural channel tab 204A, 204B, 204C, and 204D, the three bend axes are identified as shown in FIGS. 7B and 7C (e.g., 218, 222, and 224). Lastly, the method moves to operation 240 in which there is an identification of the opposite structural tabs that are to be configured with the notches 235. As described above, for example, in the first notch embodiment one of two adjacent tabs (e.g., one of the tabs 204A and 204C) may be identified to have with a notch 235 at each corner 214. Then the notches 235 are stamped, for example, in the tabs 204.

Figure 9A:
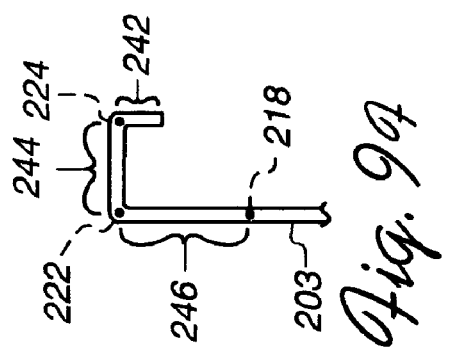
Figure 9B:
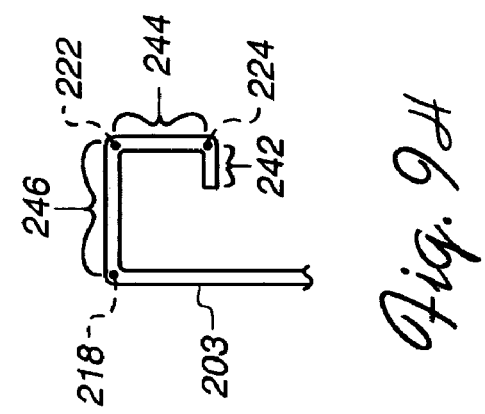
Figure 9E:
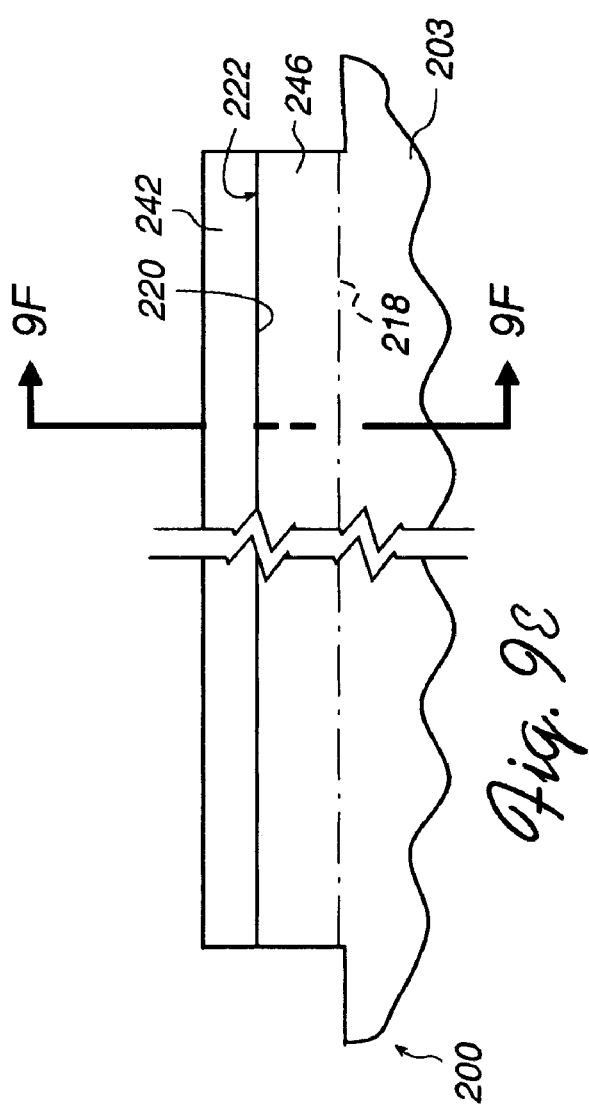
Figure 9G:
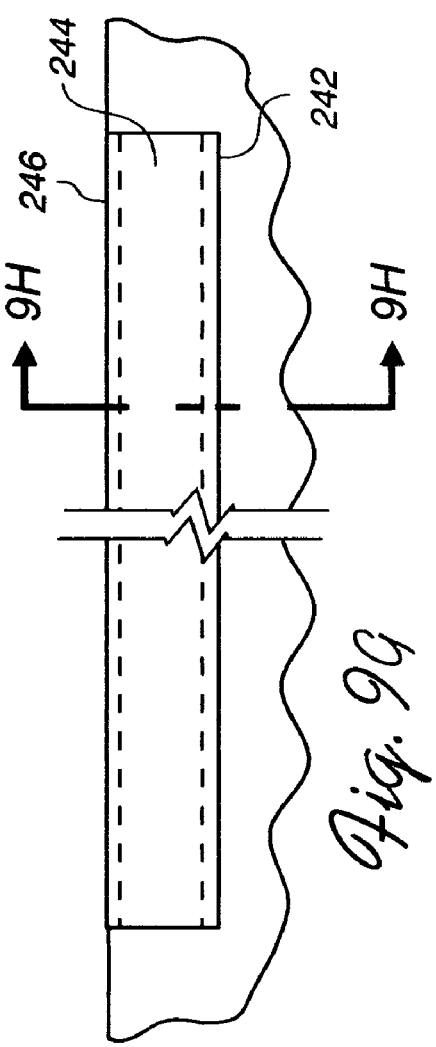

Another method of the present invention may be provided for defining a baffle 202 with structural channels 206. The method is shown in conjunction with FIGS. 9A through 9H, and is described in a flow chart 250 of FIG. 10B. In an operation 252 the sheet 203, and the tabs 204 integral with the sheet 203, are provided as described above. Operation 252 may be performed according to the flow chart 236 shown in FIG. 10A, for example. FIG. 9A shows an exemplary end tab 204A. that is an integral part of the sheet 203 of the blank 200 that is described above with respect to FIGS. 7A through 7C. The sheet 203 provided as a part of the blank 200 has an initial configuration that is flat and co-planar with the end tab 204A as shown in FIG. 9B. The exemplary end tab 204A is configured with three sections 242, 244, and 246 that are between the distal edge 220 and the proximal edge 216. A first of the sections 242 extends between the distal edge 220 and the third axis 224. The method moves to an operation 254 in which the end tab 204A, for example, is bent by moving the first section 242 relative to the second section 244, which is by bending along the third axis 224 as shown in FIGS. 9C and 9D. A second section 244 is between the third axis 224 and the second axis 222. The method moves to an operation 256 in which the end tab 204A, for example, is further bent by moving the second section 244 relative to the third section 246, which is by bending along the second axis 222 as shown in FIGS. 9E and 9F. A third section 246 is between the second axis 222 and the first axis 218. The method moves to an operation 258 in which the end tab 204A, for example, is further bent by moving the third section 246 relative to the second section 244, which is by bending along the first axis 218 as shown in FIGS. 9G and 9H. Thus, the exemplary end tab 204A is successively bent according to the present invention as a first part of four tab-bending operations, one bending operation being for each of the tabs 204A through 204D. The method then moves to an operation 260 in which a decision is made as to whether all tabs 204 have been bent. If YES, the method is DONE, else if NO, the method moves to an operation 261 in which there is a selection of the next tab 204 that has not been bent. It may be understood that based on the selection in operation 261, in this example, the bending operations 254, 256, and 258 are repeated with respect to the opposite end tab 204B, for example, which is thereby bent in a similar manner to define the baffle configuration shown in FIG. 8C. Further, it may be understood that based on the next selection in operation 261, in this example, the operations 254, 256, and 258 are repeated with respect to the side tab 204C, which is thereby bent in a similar manner to define the baffle configuration shown at the top of FIG. 8B. Lastly, it may be understood that based on the operation 261, in this example, the operations 254, 256, and 258 are repeated with respect to the opposite side tab 204D, which is thereby bent in a similar manner to complete the definition of the baffle configuration as shown in FIG. 8B. Because in this example, the side tab 204D is the last tab to be bent, operation 260 is answered YES, and the fabrication of the baffle 202 is DONE.

Figure 1A:
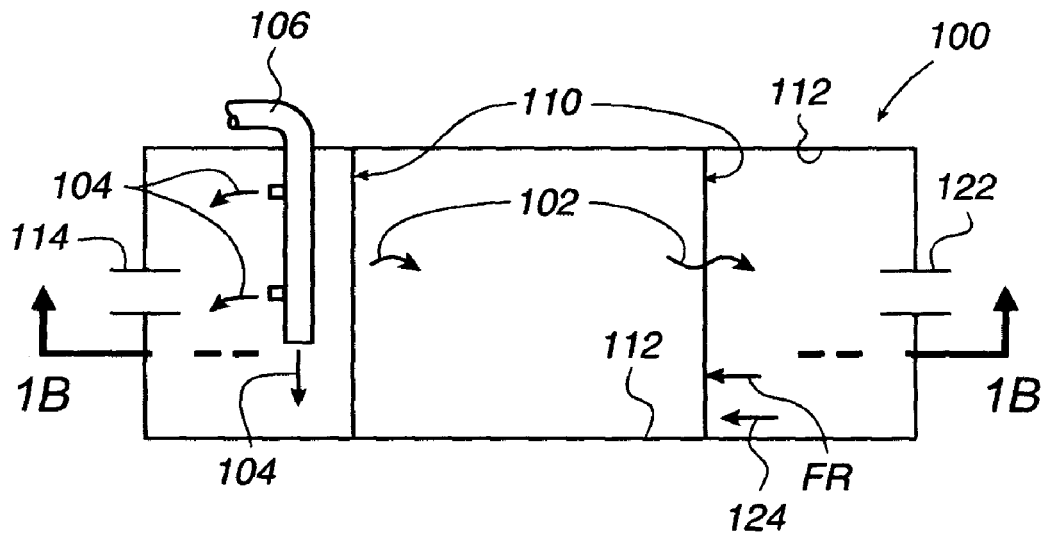
FIGS. 1A, 1B, 2A, 2B, 3A, 3B, 4A, 4B, 5A, 5B and 6 depict typical prior containers in which processes for treating liquid may occur, wherein prior flow controllers assist in performance of the processes, but the prior flow controllers generally require relatively frequent maintenance.
Figure 11A:
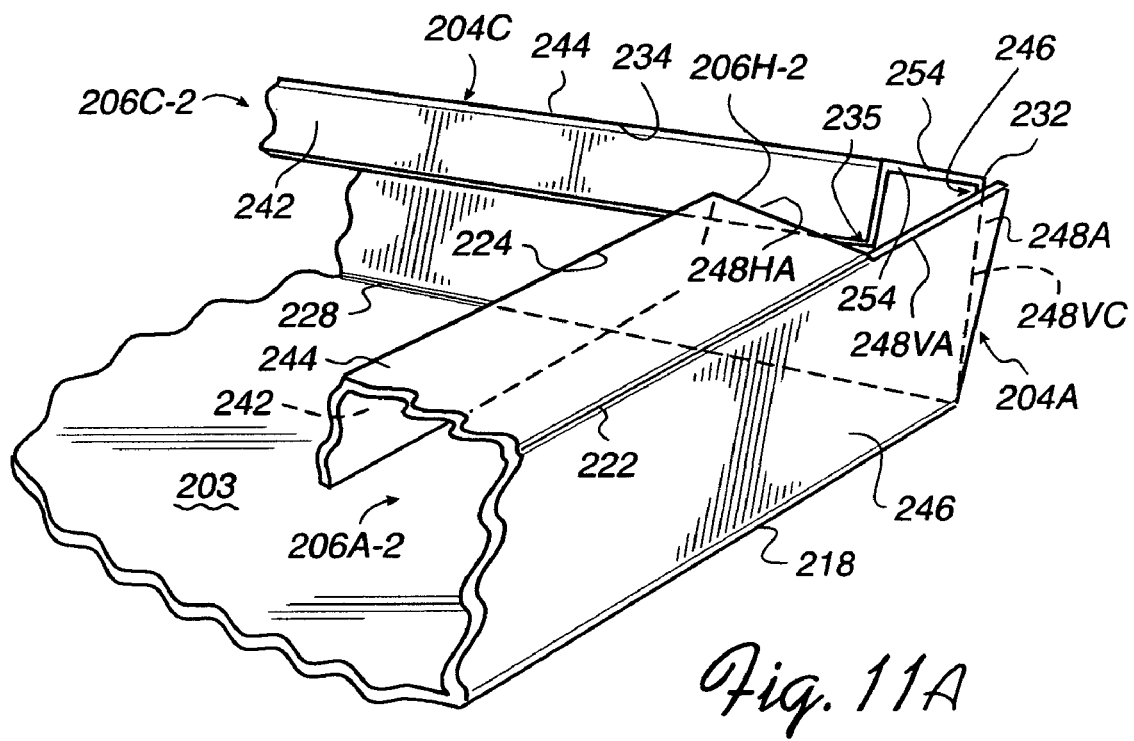
FIG. 11A is a perspective view of one corner of the first embodiment of the baffle, which is oriented as installed in a basin, illustrating a notch cut out of one of the end tabs to provide clearances which allow the end tabs to be fully bent after bending of the side tabs.
Figure 11B:
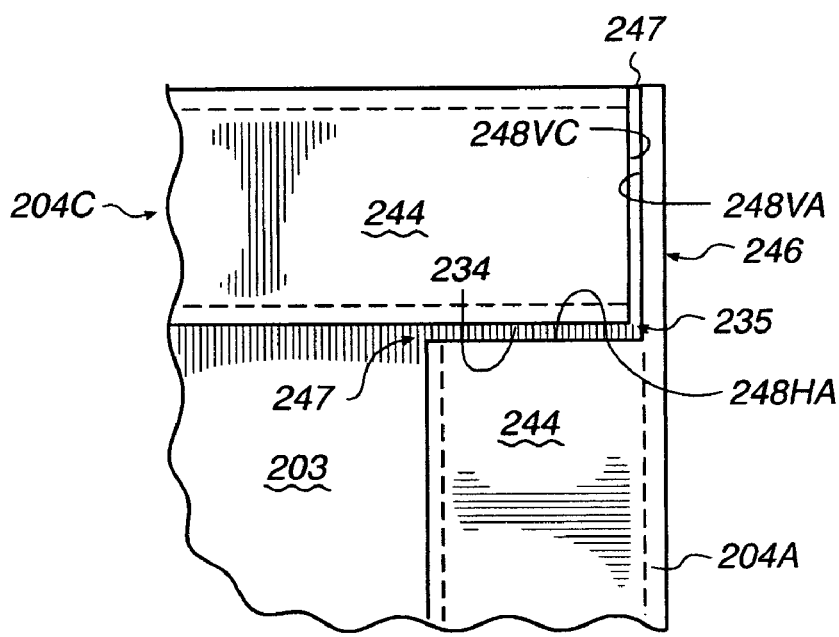
FIG. 11B is an elevational view taken along line 11B—11B in FIG. 11A, illustrating one of the notches.

Referring again to FIGS. 7A and 7C, and to FIGS. 11A and 11B, reference is made to the first embodiment of the notches 235. In the exemplary end tab 204A and side tab 204C shown in FIGS. 11A and 11B, the notches 235 are configured in the end tabs 204A, and one notch 235 is shown providing a clearance 247 detailed in FIG. 11B. The clearances 247 allow the exemplary end tabs 204A and 204B to be bent into the structural channel configuration shown in FIG. 8C after the side tab 204C and the side tab 204D have been bent into the structural channel configurations shown in FIG. 8B. FIG. 8A shows the side tab 204C extending horizontally (e.g., across a basin 100, FIG. 1A, for example). The side tab 204C extends completely between the two axes 218 of the ends 210.

FIG. 11A shows one side of the side tab 204C extending to that axis 218. As shown in FIG. 11A, the side tab 204C has been bent along the axis 228 so that the section 246 extends horizontally. The side tab 204C has also been bent along the axis 232 so that the section 244 extends vertically from the axis 232. The side tab 204C has also been bent along the axis 234 so that the section 242 extends horizontally from the axis 234. Because the side tab 204C has in this example been completely bent first (i.e., before the bending of the end tab 204A), the side tab 204C has thus assumed the fully-bent configuration shown in FIG. 8B before the start of the bending of the end tab 204A.

It is recalled that the operations 254 and 256 described in flow chart 250 (FIG. 10B) first bend the first and second sections 242 and 244 of the first end tabs 204A and 204B before bending the third sections 246 of the end tabs 204A and 204B. In contrast, in the example of FIGS. 11A and 11B, the side tabs 204C and 204D are described as having been bent before the bending of the end tabs 204A and 204B. Without any notch 235 in the side tabs 204C or 204D, but with the notches 235 in the end tabs 204A and 204B, in operation 258 the last sections 246 of the end tabs 204A and 204B may be bent along the axes 218 into the vertical position shown in FIGS. 11A and 11B without interfering with the previously-bent side tabs 204C and 204D.

Figure 10A:
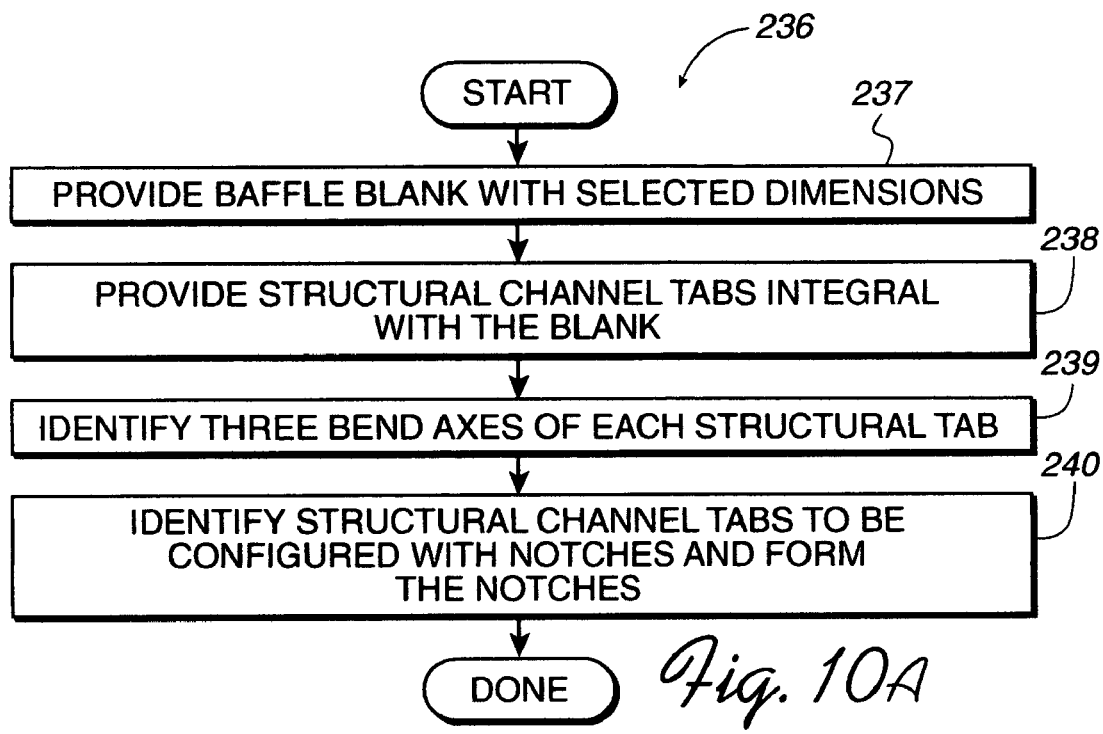
FIGS. 10A and 10B illustrate flow charts of methods of the present invention for respectively providing the blank, and configuring the blank with the plurality of structural channels.
Figure 10B:
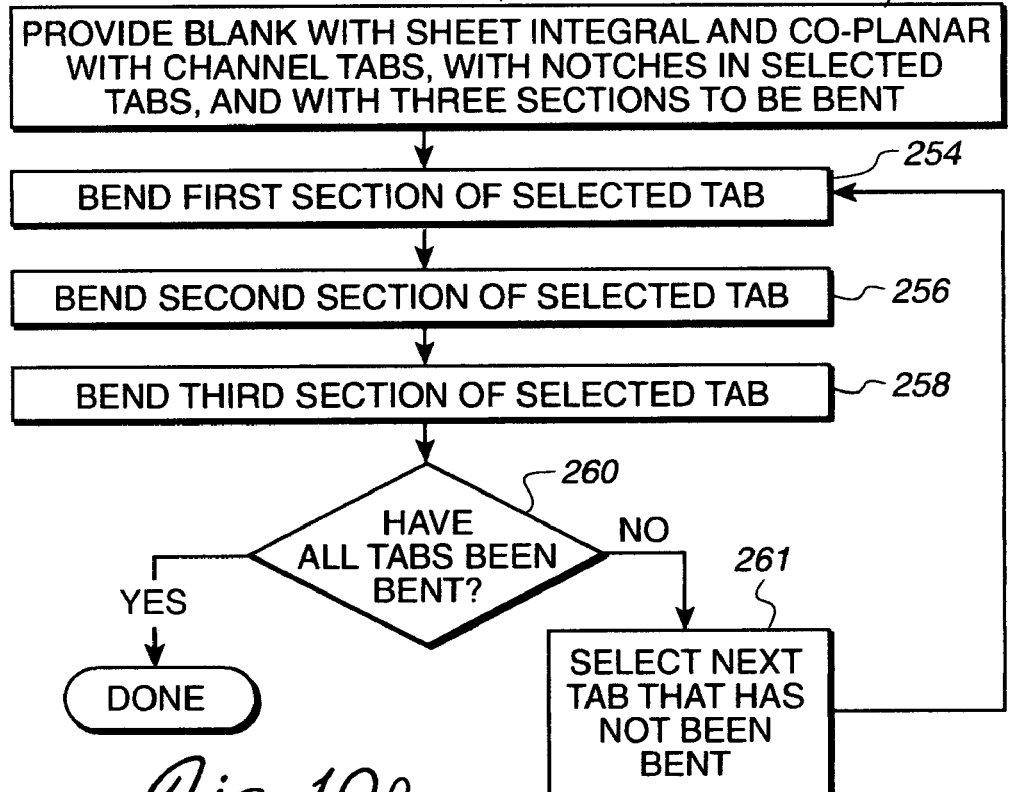

It may be understood that in the example of FIGS. 10A and 10B, when operations 254 and 256 are performed with respect to side tabs 204C and 204D, the first and second sections 242 and 244 may be bent as shown in FIGS. 8H and 8I without interfering with the previously bent end tabs 204A and 204B. The notches 235 are provided as described above so that in this example the sections 246 of the side tabs 204C and 204D may be so bent along the axis 228. Such bending of the side tabs 204C and 204D is similar to that shown in FIGS. 11A and 11B with respect to the end tab 204A.

Considering FIG. 11A, the baffle 202 is described as installed, with the sheet 203 oriented vertically and the channel 206C horizontally and the channel 206A vertically, for example. A horizontal edge 248VC (see dashed lines) of the section 246 of the side tab 204C may engage a horizontal edge 248A of the section 246 of the end tab 204A. Because of the notch 235, the respective first and second sections 242 and 244 of the end tab 204A are shown having been cut away so that a vertical edge 248V of the end tab 204A may engage, or may almost engage, a vertical edge 254 of the side tab 204C, just as the last section 246 of the end tab 204A is fully bent into the vertical position. As shown in FIGS. 11A and 11B, as the edge 248V of the end tab 204A moves leftward and approaches the edge 254 of the side tab 204C, the notch 235 is necessary to allow an edge 248HA of the section 244 of the end tab 204A to clear (i.e., pass without interference with) the axis 234 that defines the first bend of the side tab 204C. At the time the edge 248HA and the axis 234 come together, or almost together as defined by the clearance 247 in FIG. 11B, the edge 248HA will be in an overlapping relationship with the axis 234 of the side tab 204C. Because the opposite end of the end tab 204A is also provided with one of the notches 235, the opposite end of the end tab 204A will also clear the previously bent side tab 204D in the same manner.

Figure 1B:
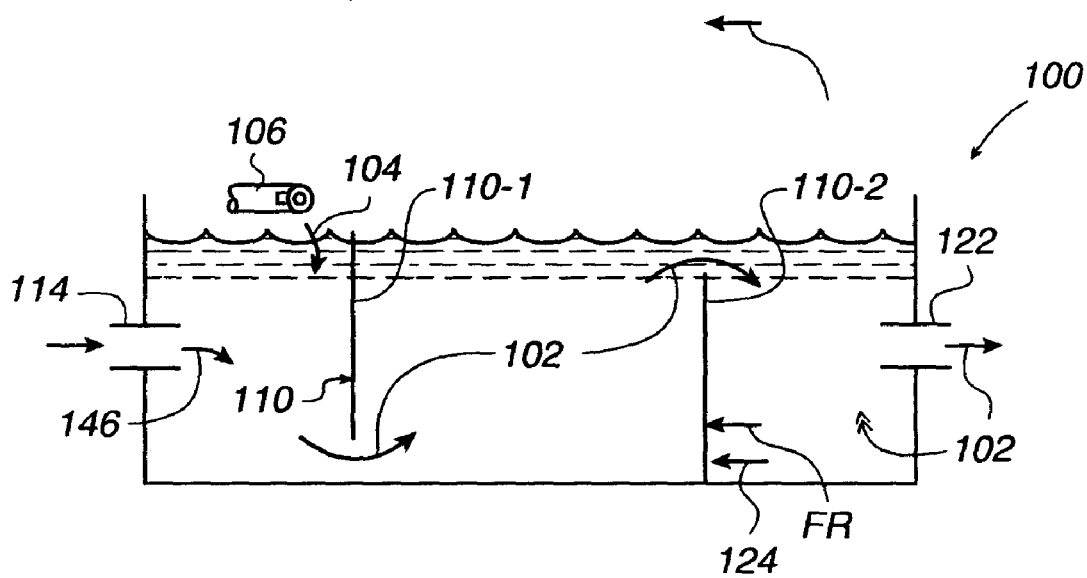
Figure 2A:
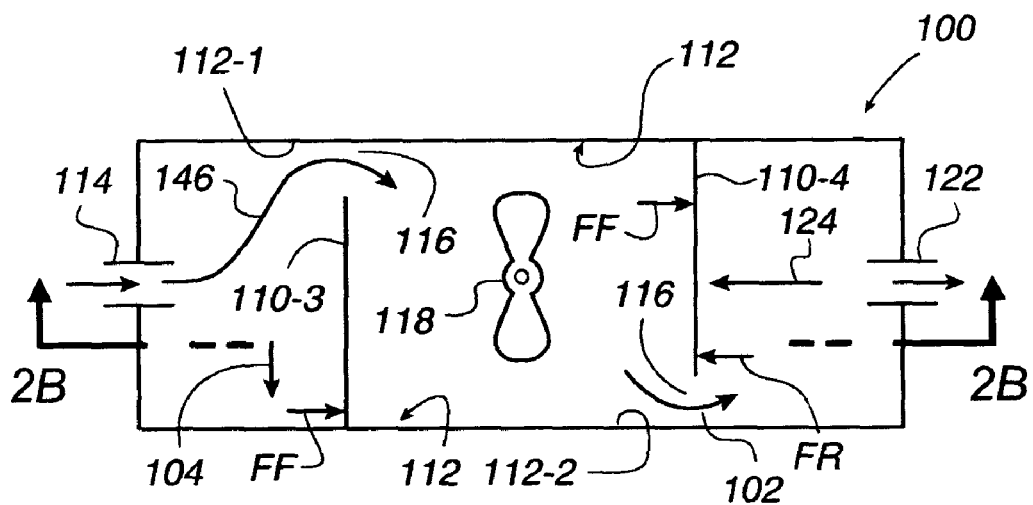
Figure 2B:
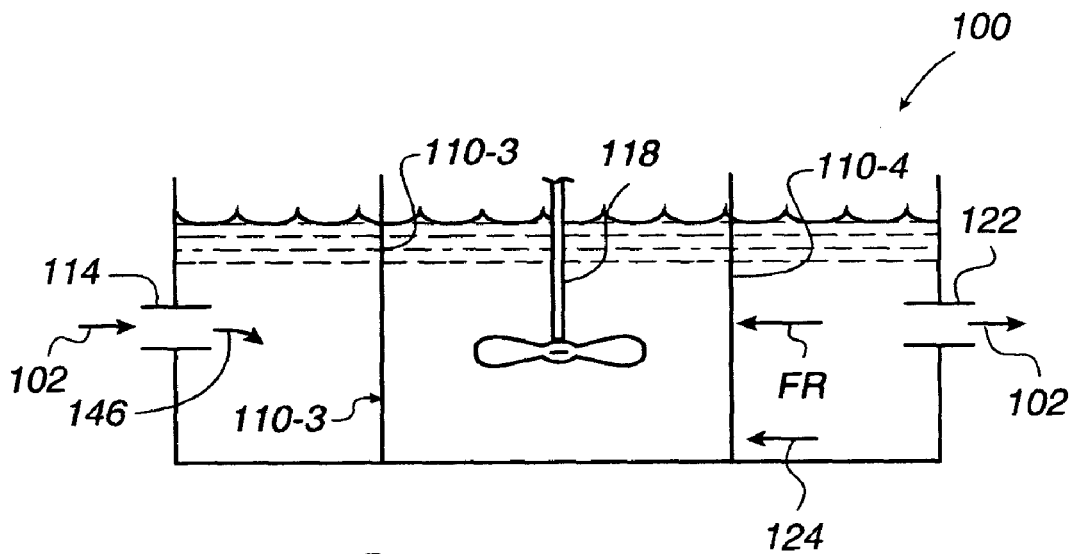

Referring again to FIG. 8A, there is shown the combination of the various tabs 204 having been bent into the configuration characterized by the plurality of structural channels 206 along each of opposite sides 208 and each of opposite ends 210 of the sheet 203. The combination of these bent tabs 204 is shown forming a frame 249 around the perimeter of the sheet 203. A section 249C of the frame 249 extends along one of the sides 208, and a section 249D of the frame 249 extends along the opposite one of the sides 208. A section 249A of the frame 249 extends along one of the ends 210, and a section 249B of the frame 249 extends along the opposite one of the ends 210. The frame 249 is configured with a flat surface 249S that is continuous except at the clearances 247. The flat surface 249S corresponds to the bent sections 244 shown in FIGS. 1A and 1B. It may be appreciated then, that the configuration of the frame 249 in extending completely around the perimeter of the sheet 203 provides support for the sheet 203 with respect to the forward and reverse forces F, respectively shown as FF and FR, for example, and such support extends along each of the sides 208 and each of the ends 210.

When the baffle 202 is received in the channels or brackets 162 in place of the boards 160, the brackets 162 hold the baffle 202 in place in the basin 100 along the second channels 206A and 206B shown in FIG. 8C. However, as described below, the baffle 202 so held by the brackets 162 is subject to certain forces. For example, referring to FIG. 12A, the first structural channel 206CD-1 is shown being subjected to the force of gravity FG. The structural configuration of the first structural channel 206CD-1 resists the force of gravity FG. Also, referring to FIG. 12B, the second structural channel 206C-2 and the second structural channel 206D-2 are shown having forces FP applied by the liquid 102 to perimeter portions that are away from the center of the sheet 203. Similarly, referring to FIG. 12D, the second structural channel 206A-2 and the second structural channel 206B-2, which are shown in plan view as installed in the brackets 162, are also shown with the forces FP applied by the liquid 102 to perimeter portions that are away from the center of the sheet 203. The forces FP may be horizontal, and in either forward or reverse directions, as applied by the liquid 102 to the baffle 202. The structural configurations of the second structural channels 206A-2, 206B-2, 206C-2, and 206D-2 resist the forces FP.

Figure 12D:
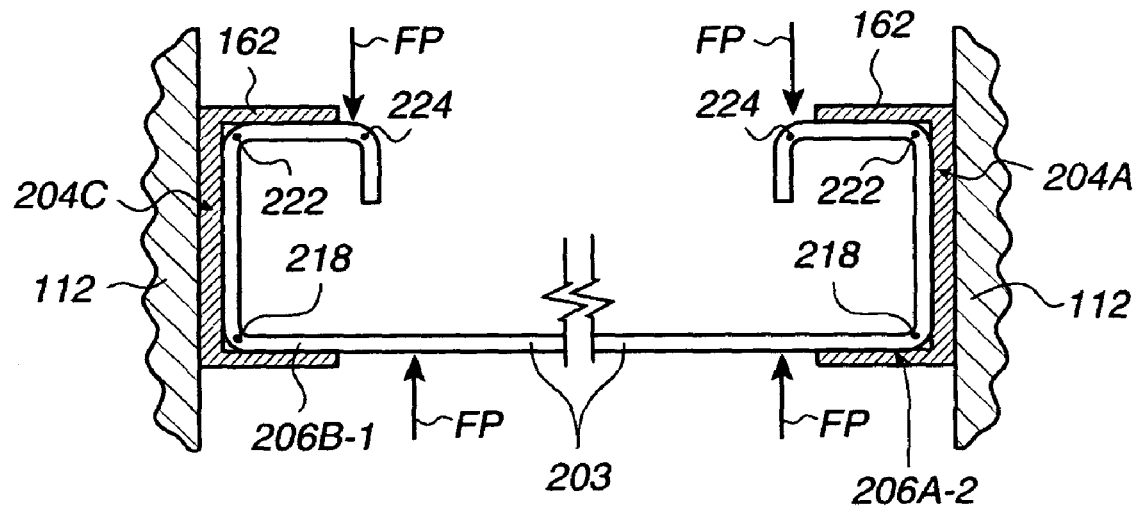
FIG. 12D is a cross sectional view of the end tabs of the first embodiment of the baffle showing forces applied by the liquid to perimeter portions of such baffle.
Figure 12E:
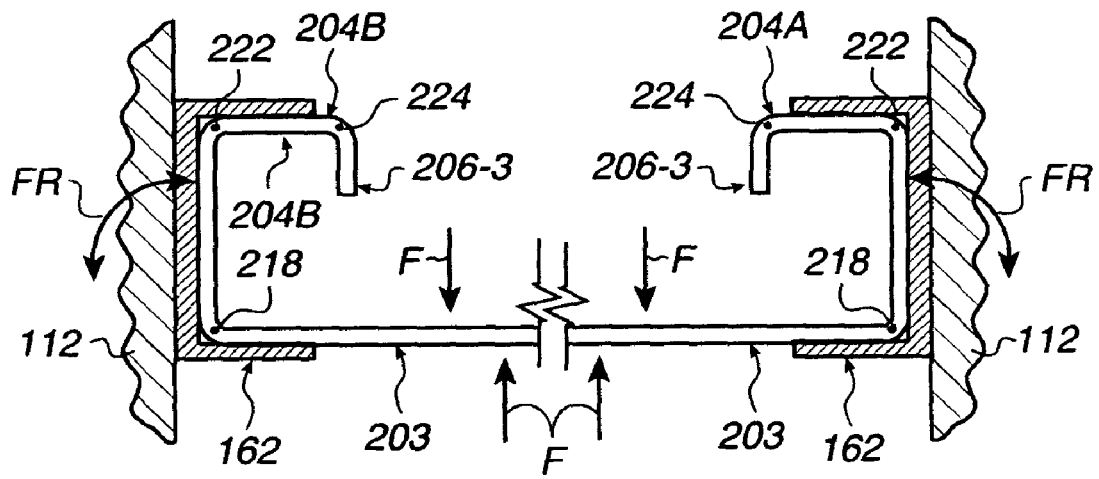
FIG. 12E is a cross sectional view of such baffle of FIG. 12D showing structural channels subject to reaction forces.

Referring to FIG. 12E, the third structural channels 206A-3 and 206B-3 are shown being subject to reaction forces FR (see curved arrows FR). The third structural channels 206A-3 and 206B-3 receive the forces FR from the sheet 203 which is receiving forward forces F (see forward-facing straight arrows F) or reverse forces F (see reverse-facing straight arrows F) from the flow of the liquid 102. A forward flow (upward in FIG. 12E) causes the sheet 203 to transmit the forward forces F through the first structural channel 206AB-1 (FIG. 8D) and through the respective second structural channels 206A-2 and 206B-2 (FIG. 12D) in an outward direction to the right shown by curved arrow FR (downward in FIG. 12E) to the third structural channel 206A-3 and in an outward direction to the left shown by curved arrow FR (downward in FIG. 12E) to the third structural channel 206B-3. A reverse flow (downward in FIG. 12E) causes the sheet 203 to transmit the forces FR through the first structural channel 206AB-1 (FIG. 8D) and through the respective second structural channels 206A-2 and 206B-2 (FIG. 12D). The transmitted force is shown by right side curved arrow FR acting to the left in FIG. 12E to the third structural channel 206A-3 and is shown by the left side curved arrow FR acting to the right to the third structural channel 206B-3.

Similarly, as shown by the elevational view of in FIG. 12C, the third structural channels 206C-3 and 206D-3 are subject to the reaction forces FR (see curved arrows FR). The third structural channels 206C-3 and 206D-3 also receive the reaction forces FR (see curved arrows FR) from the sheet 203 which is receiving forward forces F from the flow of the liquid 102. The sheet 203 transmits the forward forces F (to the right in FIG. 12C) through the first structural channel 206CD-1 (FIG. 12A) and through the respective second structural channels 206C-2 and 206D-2 (FIG. 12B) as respective outward forces FR (see upwardly curved arrow FR) around axis 228 to the third structural channel 206C-3. The forward force F is also applied to the third structural channel 206D-3 as an outward force FR (see downwardly curved arrow FR). The configurations of the respective third structural channels 206A-3, 206B-3, 206C-3, and 206D-3 resist the forces FR from the liquid 102.

Figure 13:
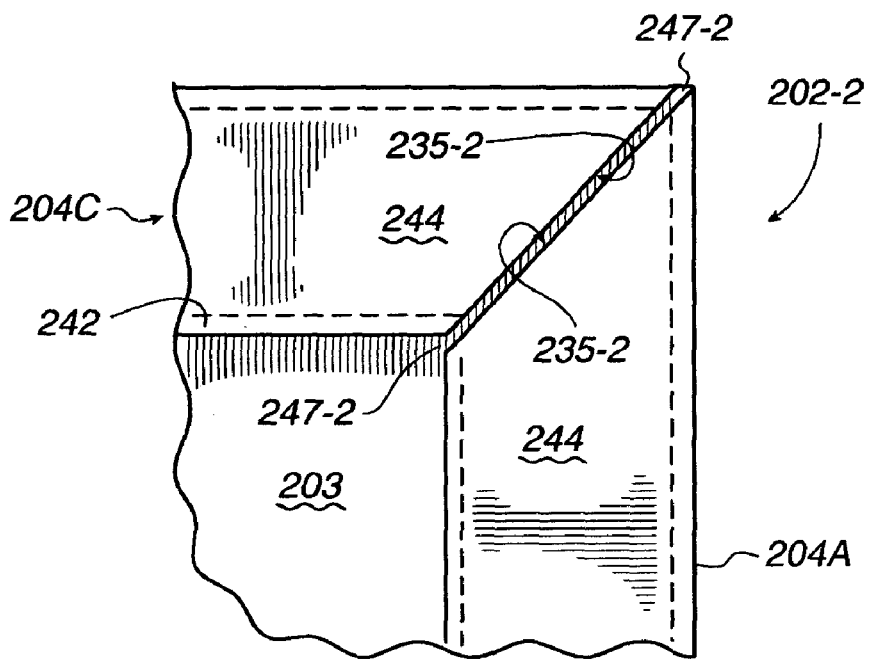
FIG. 13 is an elevational view of a second embodiment of the baffle of the present invention installed in a basin, showing mitered notches formed in each of adjacent channel structures of the end and side tabs.

Another embodiment of the baffle 202-2 is shown in FIG. 13 including a second embodiment of the notches, which are referred to as notches 235-2. FIG. 13 shows the notches 235-2 configured in each of an adjacent exemplary end tab 204A and side tab 204C. The notches 253-2 are each mitered, that is, cut at a diagonal angle in each of the sections 244 of the respective end tab 204A and side tab 204C, and then are cut downwardly in the respective sections 242 of each such tab 204A and 204C. Similar notches 235-2 are provided in each adjacent end tab 204A and side tab 204D, and each adjacent end tab 204B and each adjacent side tab 204D, and end tab 204B and side tab 204C. The notches 235-2 are shown in elevational view in FIG. 13 in a manner similar to how FIG. 11B shows the notches 235, and are exemplary of those other notches 235-2. A clearance 247-2 is shown in detail in FIG. 13. With the side tab 204C having been first bent into the shape of the channel 206C (see FIG. 8B, for example), the clearance 247-2 extends between the end tab 204A and the side tab 204C to allow the exemplary end tab 204A to be bent into the structural channel configuration shown in FIG. 8C after such bending of the side tab 204C.

Figure 14:
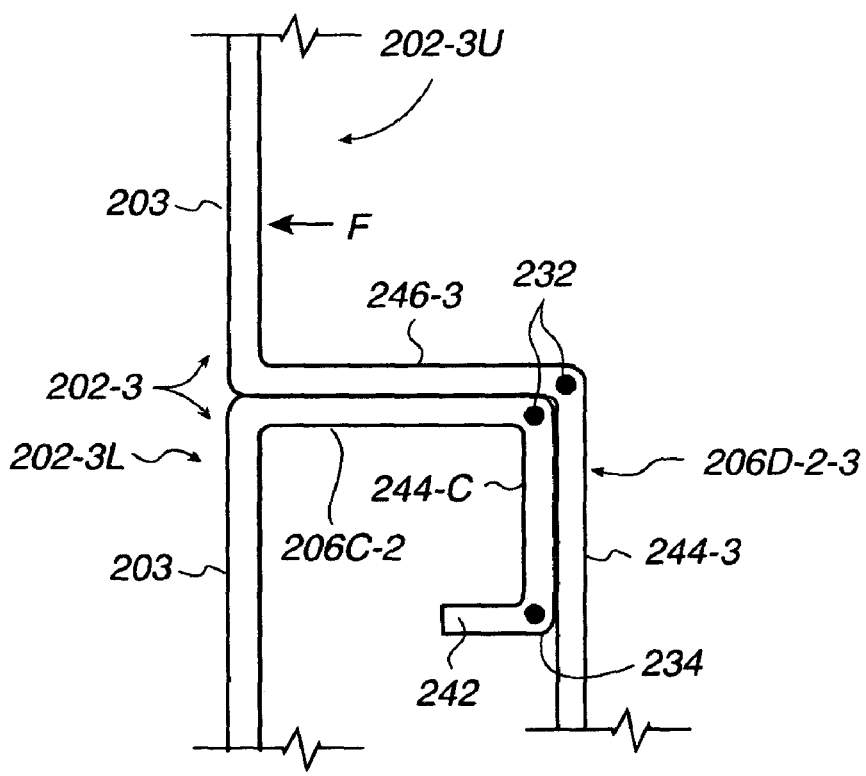
FIG. 14 is a side elevational view of two baffles of a third embodiment the baffle of the present invention, one baffle being above the other and having a differently bent channel section.

FIG. 14 shows another embodiment 202-3 of the baffles 202, which facilitates another type of cooperation of two or more of the baffles 202-3 (shown as 202-3U and 202-3L) when placed one above the other. FIG. 14 shows an elevational side view of the baffles similar to FIG. 8B, but with the two baffles 202-3U and 202-3L shown placed one above the other. The lower baffle 202-3L is shown having the same channel configurations 206C-2 and 206C-3 as is shown in respective FIGS. 12B and 12C. However, the bottom side tab 204D of the upper baffle 202-3U is shown having the section 244 (identified as the section 244-3) of a channel 206D-2-3 bent oppositely to that shown in FIG. 12C so that the section 244-3 extends downwardly and overlaps the section 244-C of the channel 206C-2 of the lower baffle 202-3L. Also, the location of the bend axis 232 of the lower baffle 202-3 may be spaced from the sheet 203 suitably to facilitate such overlapping. The section 244-3 may extend straight, past the respective bend axis 234 of the lower baffle 202-3L, for example. It is observed that the channel section 244-3 is offset from the respective sheet 203 in the vertical direction shown in FIG. 14 to define a channel space bounded by the section 246-3 and the section 244-3. The lower baffle 202-3L is received in the channel space. It is also observed that the channel section 244-3 is offset from the sheet 203 in the horizontal direction. Because of the overlapping of the section 244-3 and the section 244-C, the upper baffle 202-3U withstands a right to left force FR (FIG. 14) from the liquid 102. In more detail, the upper channel 206C-2 of the lower baffle 202-3L assists in resisting such force FR, and the section 244-C supports the section 244-3 against such force FR. Such right to left force FR may be the primary, or forward, force that is applied by the liquid 102 against the baffles 202-3 most of the time in the operation of the settler 130, for example, such that most of the time during such operation, the channel 206D-2-3 of the upper baffle 202-3U is held aligned by the lower baffle 202-3L as the respective upper and lower baffles 202-3U and 202-3L extend across the width of the basin 100 or across a section 110S of the basin 100.

In review, with the configurations of the structural channels 206 in mind, it may now be understood that the present invention fills the above-described needs by providing the baffle 202 having no shape-holding facilities other than bends at each of the respective first, second, third, fourth, fifth, and sixth axes 218, 222, 224, 228, 232, and 234 to define the plurality of structural channels 206. The baffle 202 may thus control the flow of the liquid 102 in any of the above-described liquid treatment equipment, e.g., for the contact-type or the physical-type of processes. It may also be understood that the present invention also fills these needs through the method of flow chart 236 of providing the unbent blank 200 for making such baffle 202, and through the method of flow chart 250 by bending such unbent blank 200 to provide such baffle 202. In particular, the preferably stainless steel unbent baffle blank 200 may be deformed by the described bending into the configuration that defines a plurality of the structural channels 206. As described above, the deformed blank 200 need not be held bent in such configuration by any fastener or welding, for example.

Rather, the plurality of structural channels 206 render the baffle 202 able to withstand the various respective forces F, FP, and FR, for example, applied to the baffle 202 by the incoming liquid 102 and by liquid 102 having a reverse flow direction in the basin 100. Without use of such welding or such fasteners, the baffle 202 remains in the desired bent configuration of the structural channels 206 notwithstanding such forces applied to the baffle 202 during the flow control operation of the baffle 202. The description of such bent baffle 202 (that is not welded or fastened or otherwise secured in the desired configuration) as a "solely-bent" baffle 202 thus indicates the structural characteristic of only being bent into the configuration implementing the desired plurality of structural channels 206, and the structural characteristic of staying in such bent configuration without being retained in such configuration by welds or by fasteners or by any other structure added to the bent material from which the blank 200 is made.

As a result, the solely-bent baffle 202 does not have any of the above-noted corrosion sites that are typically found adjacent to locations at which welds are made. Also, the solely-bent baffle 202 does not have any holes to allow a fastener to extend through the baffle 202, such that there is no weakening of the solely-bent baffle 202 by such holes and no tendency of normal operational vibrations to cause a fastener to become loose. The absence of such welds and holes and fasteners increases the potential period of time during which the soley-bent baffle 202 may remain in service without maintenance (e.g., removal and replacement). Additionally, because the solely-bent baffle 202 does not absorb the liquid 102 and thus does remain in an original relatively light-weight condition (as compared to concrete or liquid-saturated redwood), any required maintenance may be easier and safer to perform using maintenance staff rather than costly hoists or other lifting equipment.

FIG. 15A shows a blank 200H of material for a fourth embodiment of the baffle of the present invention. The baffle is baffle 202H shown in FIG. 16. The baffle 202H is configured to resist not only the normal forces (e.g., FF, FIG. 18) applied by the liquid 102 to the baffle 202H during the normal process operations, but is also configured to withstand the uncontrolled dynamic forces (that are referred to as the hydrodynamic forces HF, FIG. 18) without being shattered or broken by such hydrodynamic forces HF. The blank 200H may be configured the same as the central sheet 203 described above, and has the following additional configuration. The opposite channel tabs 204A and 204B are configured with opposite first hinge members 298. The first hinge members 298 of one embodiment may be hinge apertures 300. The hinge apertures 300 define a hinge axis 301 (FIG. 16) and are located between the first axis 218 and the notches 235. As described below, the hinge members 298 (e.g., the hinge apertures 300) may be positioned at any one of many locations between opposite ends 302 of the channel tabs 204A and 204B.

Figure 15B:
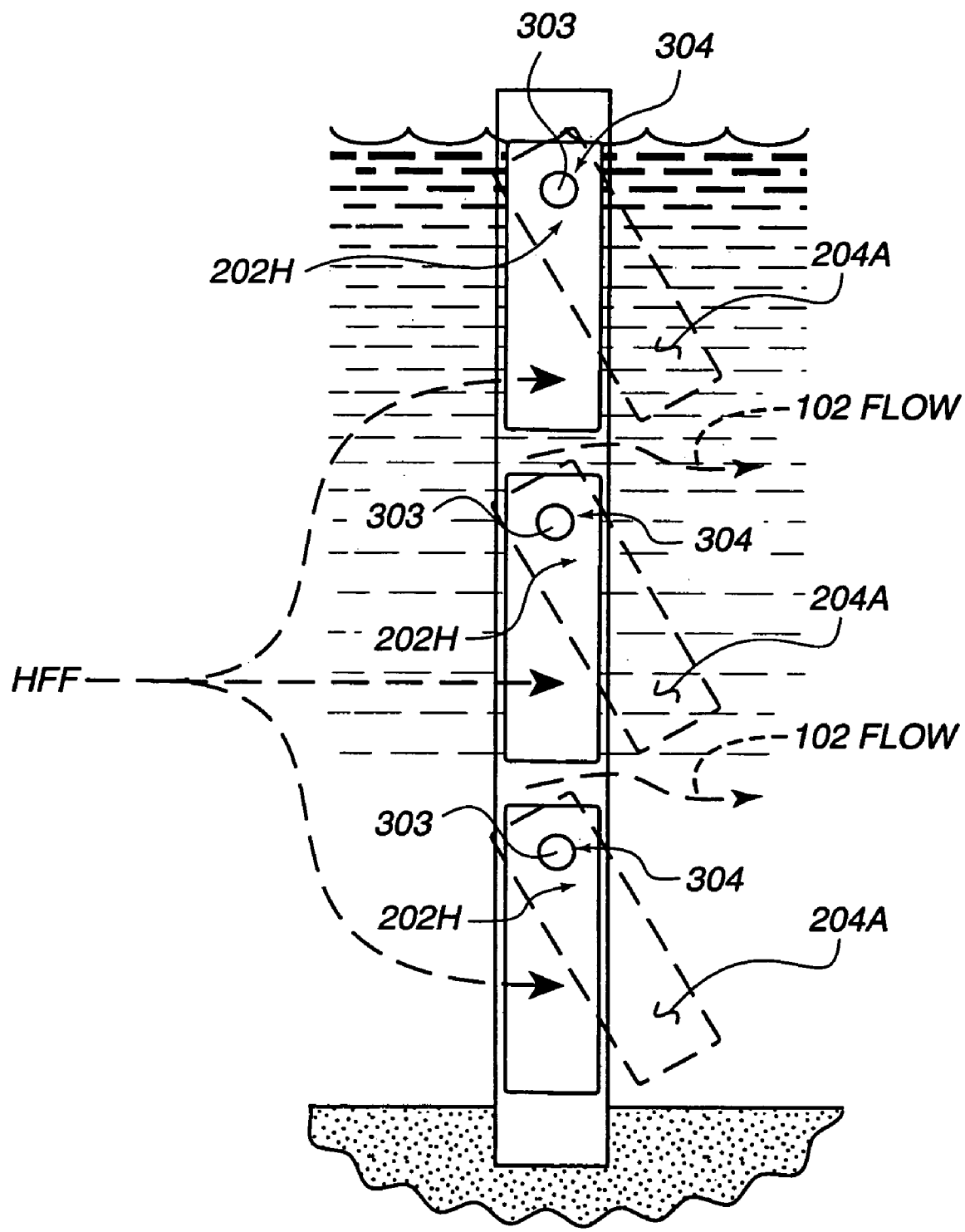
FIG. 15B illustrates a side elevational view of many baffles made from the blank shown in FIG. 15A, where the hydrodynamic forces have pivoted the baffles on the respective hinge members from a normal vertical orientation to a tilted orientation to relieve the effect on the combined baffles of the hydrodynamic forces.
Figure 15E:
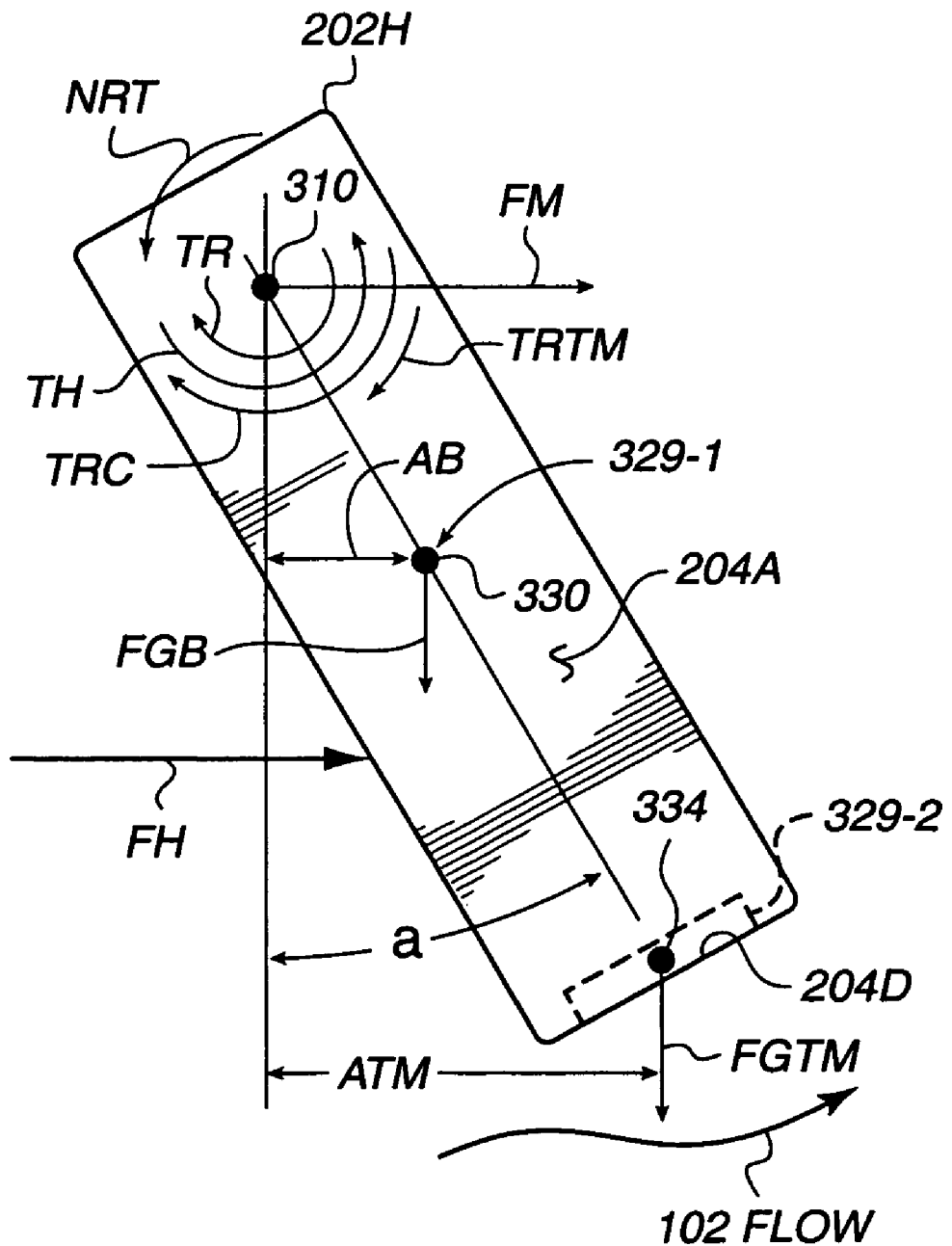
FIG. 15A illustrates a blank of the present invention for making a fourth embodiment of baffle of the present invention having soley-bent structural channels, wherein the blank is configured with opposed hinge members to adapt such baffle for use in basins that are subject to the hydrodynamic forces.
FIG. 15C is an enlarged view of a portion of FIG. 15B, illustrating a restorative torque that returns the baffle to the normal orientation after the hydrodynamic forces subside.

FIG. 15B generally illustrates an end view of many baffles 202H made from the blanks 200H shown in FIG. 15A. Each of the baffles 202H is mounted in the orientation shown in FIG. 8A with the bent channel tabs 204C and 204D extending horizontally. FIG. 15B shows the end channel tabs 204A, for example. The baffles 202H are shown mounted in a vertical array, one above the other. The baffles 202H are normally oriented as shown in solid lines, which is in vertical alignment with respect to each other. The normal orientation is maintained, or substantially maintained, notwithstanding the normal forces FF and FR. For clarity of illustration, the forces FF and FR are not shown. The force FF acts from left to right on the vertical baffles 202H. The vertically aligned baffles 202H resist the force FF and remain substantially in such vertical alignment. In this fourth embodiment, because of the configuration shown in FIG. 15A, the baffle 202H may be mounted on second hinge members 303 (FIGS. 15B and 18) that cooperate with the hinge apertures 300 shown in FIG. 15A. The first hinge member 298 and the second hinge member 303 cooperate to form a hinge 304. The baffles 202H are thus mounted for rotation on the hinge axis 301 of the hinges 304. FIG. 15B shows the hydrodynamic forward force HFF, which may also be called a hydrodynamic load. Because of the interruption of the normal processing by the hydrodynamic force HFF, the normal force FF, for example, may not last long. The hydrodynamic force HFF is in addition to any remaining normal force FF, for example. The hydrodynamic force HFF is shown acting on the mounted baffles 202H to rotate the baffles 202H into release, or tilted, orientations shown in dashed lines in FIG. 15B. FIG. 15B shows that in those release orientations of the baffles 202H, there is hydrodynamic flow of the liquid 102 through the vertical array of the baffles 202H (see arrows 102FLOW). Tilting of the baffles 202H occurs in response to the hydrodynamic forces HFF and allows the hydrodynamic flow 102FLOW of the liquid 102 to occur and be resisted by a restorative torque TR shown in FIG. 15C.

FIG. 15C is an enlarged view of one embodiment of the baffle 202H. The restorative torque TR of such baffle 202H is a function of the weight of the baffle 202H (represented by the force of gravity FGB) and a moment arm A (shown as "AB" to correspond to the baffle 202H) through which the force FGB acts. In turn, the value of the moment arm AB is a function of an angle alpha (abbreviated as "a") defined by the baffle 202H with respect to vertical. Because the liquid 102 flows (see arrow 102FLOW) through the array of baffles 202H, a mounting force FM exerted on the hinges 304 by the tilting baffle 202H is substantially less than the hydrodynamic force HF. For comparison, reference is again made to FIG. 6 which shows the forces HF exerted by the redwood boards 160 of the baffle 110 on the channels 162. As described above, when the standard redwood baffles 110 are subject to the hydrodynamic forces HF (e.g., HFF or HFR caused by an exemplary earthquake of considerable magnitude), the boards 160 held by the channels 162 may shatter, for example, and often severely damage aerator heads and other equipment (not shown) in the basin 100. Such damage generally needs to be corrected by significant maintenance immediately after an earthquake, which often results in lengthy shutdown of the equipment in the basins 100. Thus, in contrast to the configuration of the redwood boards 160 for reception in the channels 162, and in contrast to the fixed mounting of the redwood boards in the channels 162, the baffles 202H are configured and mounted to withstand the hydrodynamic forces HF without being shattered or broken by the hydrodynamic forces HF. The configuration and mounting of the baffles 202H releases a substantial amount of the hydrodynamic forces HF. Further, because of the restorative torque TR, the baffles 202H do not require immediate post-earthquake maintenance before normally functioning once again (in the vertical positions shown in FIG. 15B) to block the normal forces FF and FR of the liquid on the baffles 202H.

Figure 16:
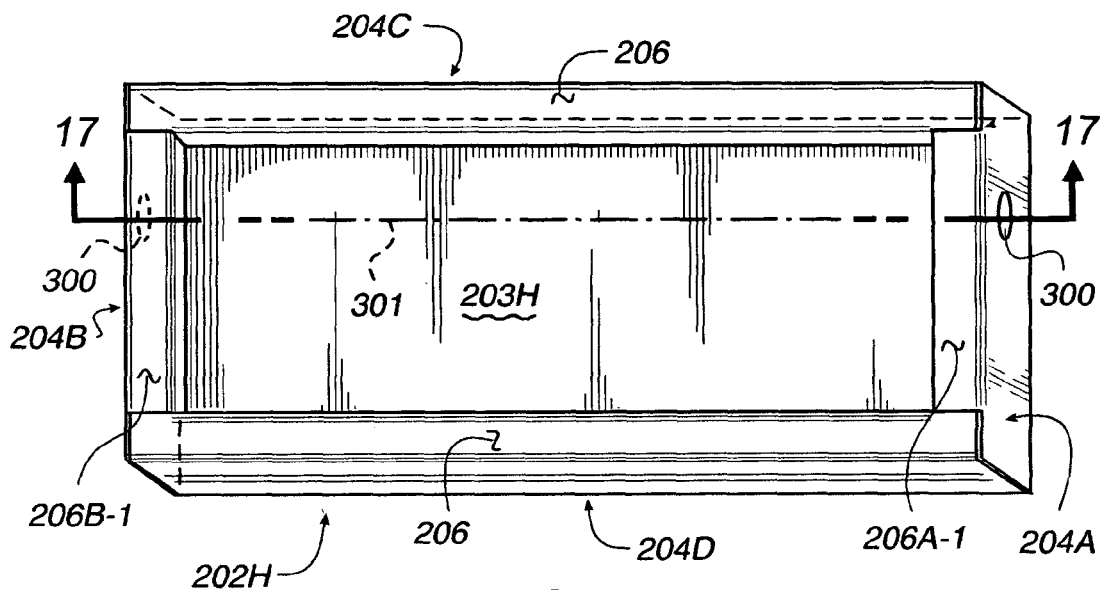
FIG. 16 illustrates a perspective view of one baffle made from the blank shown in FIG. 15A.
Figure 17:
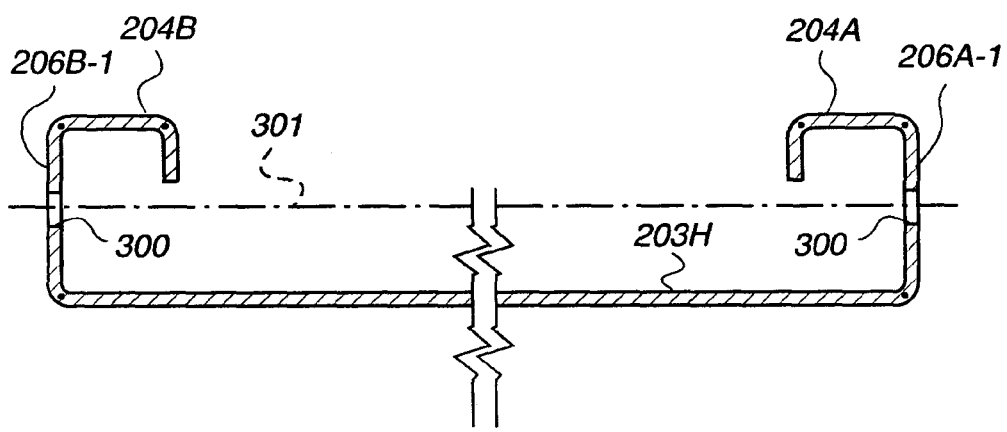
FIG. 17 illustrates a cross sectional view of the baffle shown in FIG. 16, illustrating an embodiment of the hinge members in the form of holes configured to receive hinge pins.

FIG. 16 is a perspective view similar to FIG. 8A illustrating the integral sheet 203H with the channel tabs 204A through 204D bent in the manner shown in FIGS. 8A through 8C to define a plurality of the structural channels 206. Each of the structural channels 206A-1 and 206B-1 is shown in FIG. 17 having one of the hinge apertures 300, which is shown in detail in FIG. 17.

Figure 6:
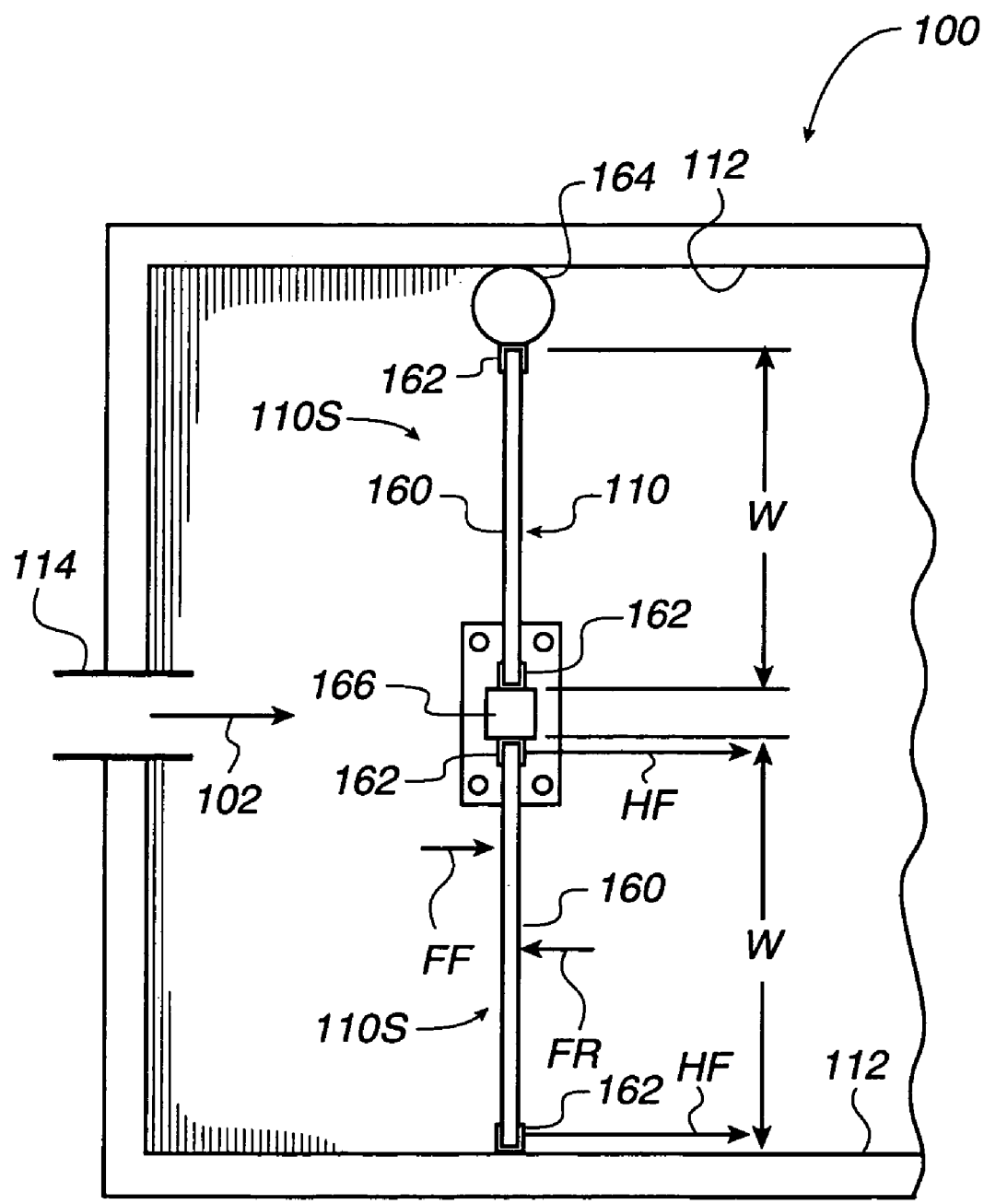
Figure 18:
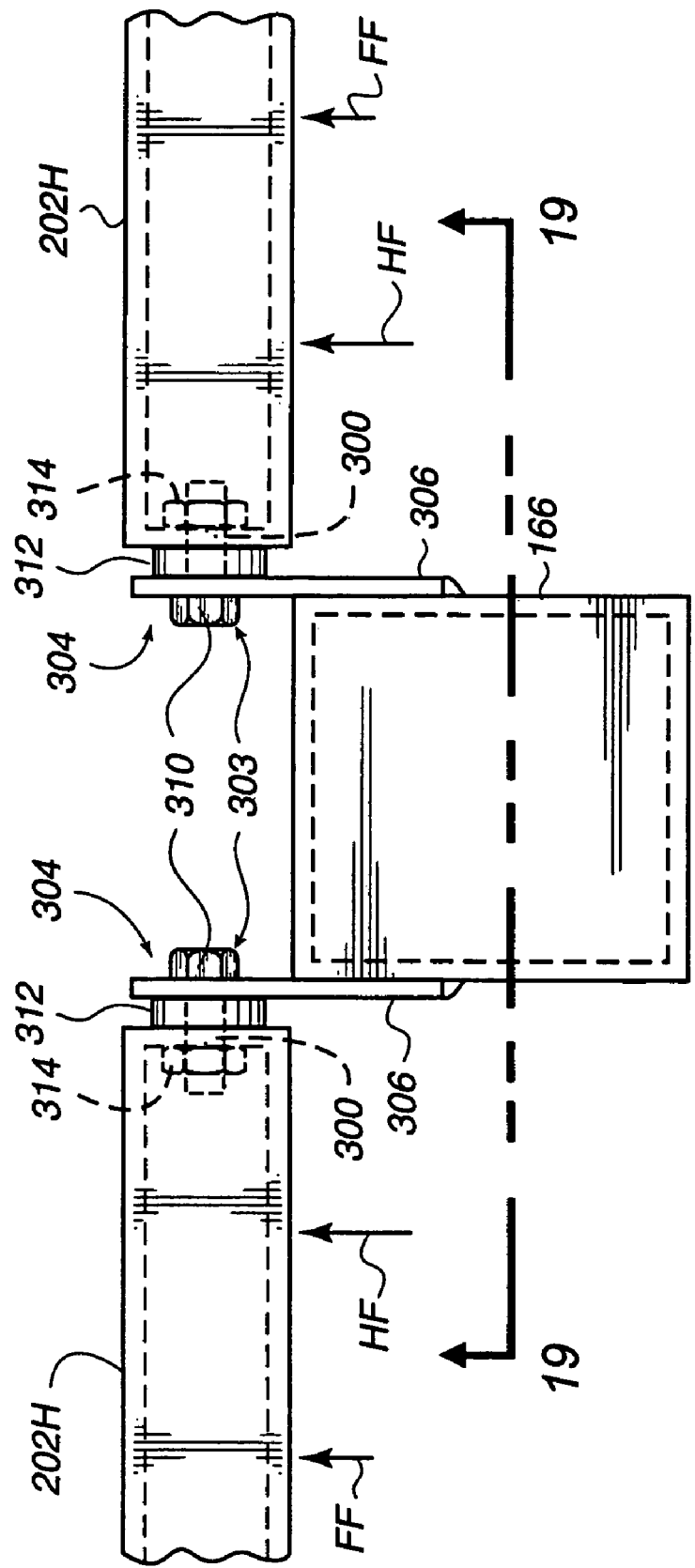
FIG. 18 illustrates a plan view of the baffle shown in FIG. 16, illustrating a pair of flat bars mounted on a pier for supporting the hinge pins and the baffles.

FIG. 18 illustrates a plan view of the baffle 202H shown in FIG. 16, showing a pair of flat bars 306 mounted on the pier 166 for supporting the hinges 304. In this hinge embodiment, the hinges 304 may be configured as an assembly that includes a hole in the flat bar 306 to receive a bolt 310. The bolt 310 extends through a bushing 312 that separates the baffle 202H from the flat bar 306. The bolt 310 extends further through the hinge aperture 300 in the baffle 202H. The bushing is made from a low friction material, such as polyethylene, to reduce friction between the flat bar 306 and the baffle 202H. A lock nut 314 is threaded onto the threaded end of the bolt 310 to retain the baffle 202H on the bolt 310. Opposite ends of the baffle 202H are mounted on a respective one of the hinges 304 to mount the baffle 202H between spaced piers (e.g., the piers 164 or 166), or between one column 166 and one pier 164 as shown in FIG. 6. Thus, the baffles 202H are mounted on the hinges 304 horizontally as shown in FIG. 8A for rotation on the horizontal hinge axis 301. FIG. 19 illustrates the mounting of the baffle 202H shown in FIG. 18, with the baffle 202H hanging down, or suspended, from one of the hinges 304.

Figure 20A:
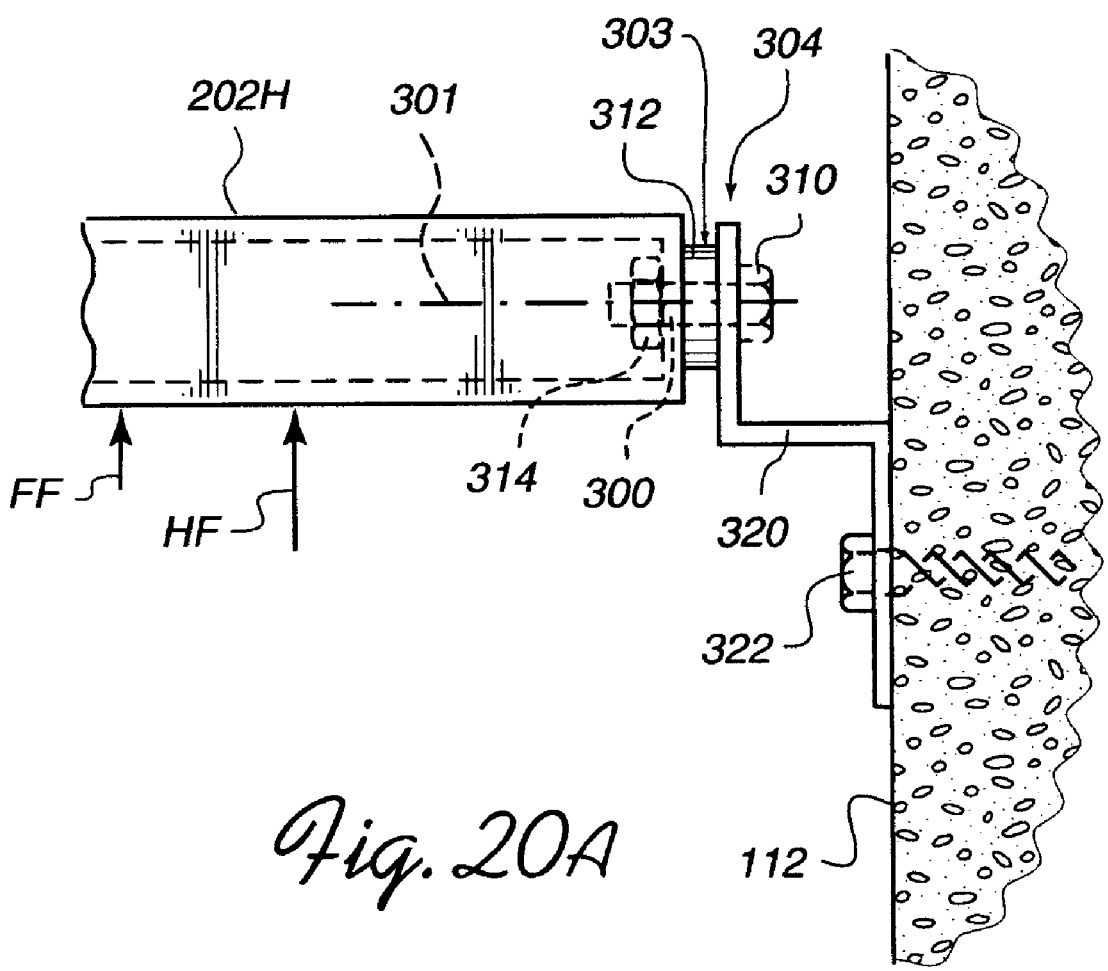
FIG. 20A illustrates a plan view of the baffle shown in FIG. 16, illustrating one "Z" bar mounted on a wall of the basin for supporting one of the hinge pins and a baffle.

FIG. 20A illustrates a plan view of the baffle 202H shown in FIG. 16, showing another embodiment of how the baffle 202H may be mounted. One "Z" bar 320 is shown mounted by an anchor bolt 322 on a wall 112 of the basin 100 for supporting one of the hinges 304. The structure of the hinge 304 is the same as that described above, such that the baffle 202H may be mounted so as to rotate on the hinges 304 in response to the hydrodynamic forces HF, and in response to the restorative torque TR.

Figure 20B:
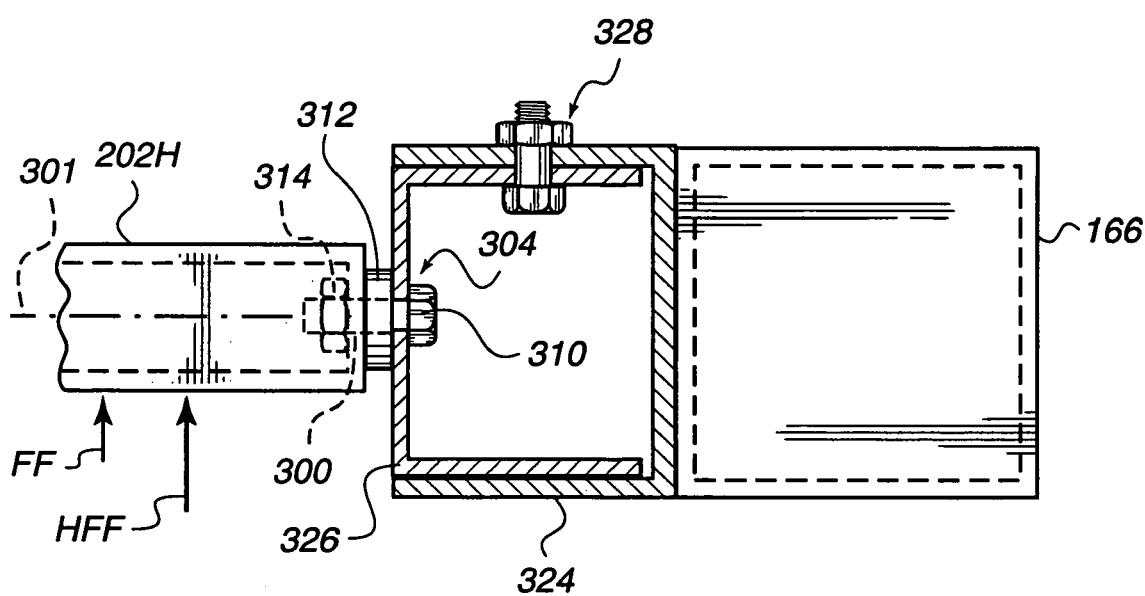
FIG. 20B illustrates a first channel-shaped bracket mounting a second channel-shaped bracket on which the baffles is mounted for rotation.

FIG. 20B illustrates a plan view of the baffle 202H shown in FIG. 16, showing yet another embodiment of how the baffle 202H may be mounted. One pier, such as the pier 166 shown in FIG. 6, may be used. That pier 166 is typically provided with a first bracket 324 that extends vertically along the vertically extending pier 166. An opposite second pier 166 (not shown) is spaced from the one pier 166 and is also provided with a first bracket 324. Many of the baffles 202 of the first baffle embodiment may be placed in the first brackets 324, one on top of each other to define a surface that does not provide the release of the hydrodynamic forces (e.g. HFF shown in FIG. 20B). To provide some amount of such release, FIG. 20B shows a second bracket 326 inserted into the lower end of the first bracket 324. The bottom of the second bracket 326 is at an elevation of about two inches above the floor 136 of the basin 100. Another second bracket 326 is also inserted into the lower end of the opposite first bracket 324, at the same elevation above the floor 136 of the basin 100. The second brackets 326 are held in or attached to the channel 324 by one or more fasteners 328. The second brackets 326 are each thus positioned for supporting one of the hinges 304. The structure of the hinges 304 is the same as that described above, such that the baffle 202H may be mounted to rotate on the hinges 304 in response to the hydrodynamic forces HF, and in response to the restorative torque TR. It may be understood that the baffle 202H of this embodiment provides one baffle 202H at the bottom of a vertical array of baffles 202 of the first embodiment shown in FIGS. 8A through 8C, for example. In addition to providing some of the release in the event of an earthquake, for example, the bottom baffle 202H may also rotate as described above to permit large equipment to move under the array of baffles 202 without interfering with the array of baffles 202.

Figure 21:
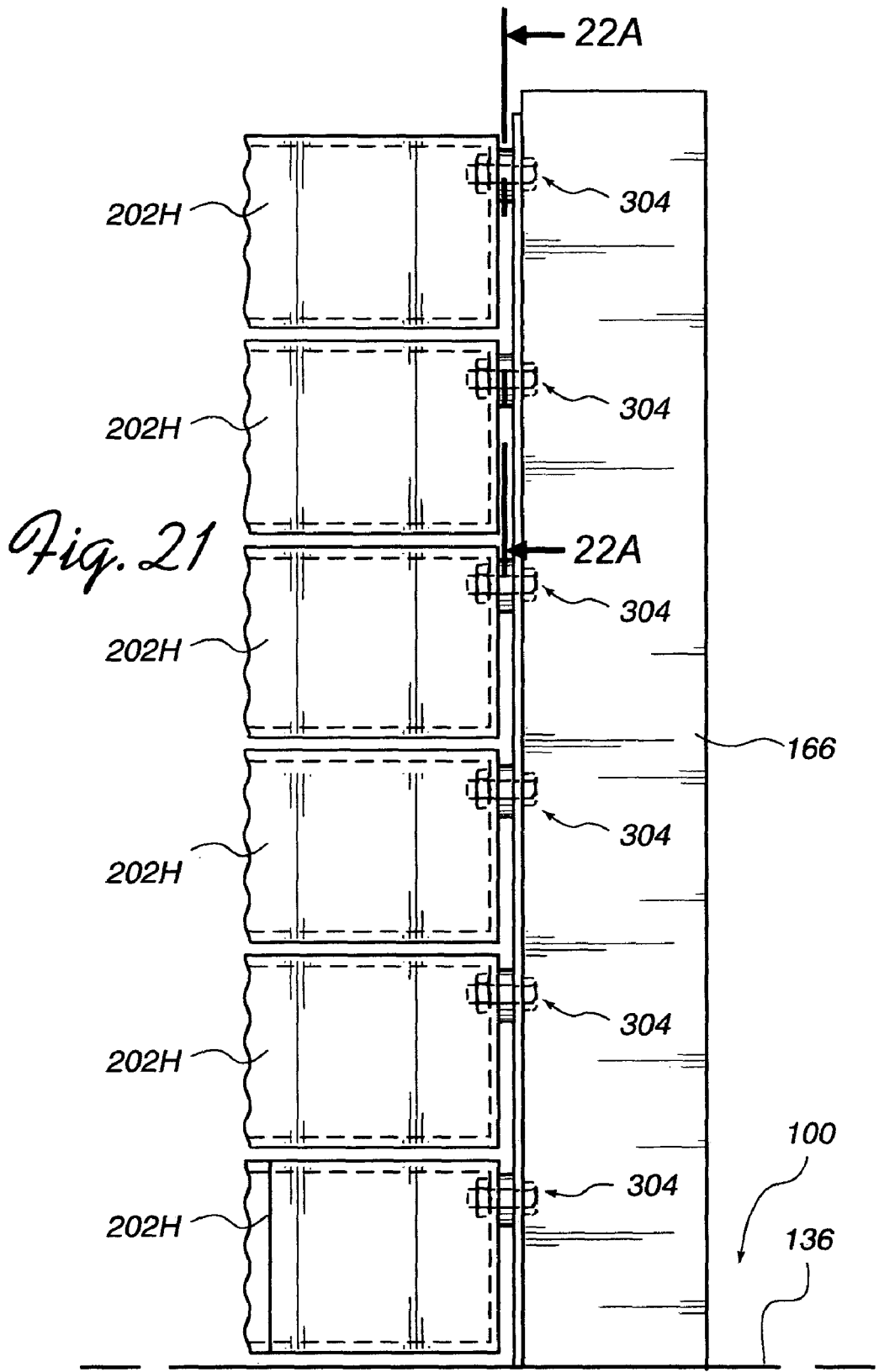
FIG. 21 is a front elevational view of many baffles made from the blank shown in FIG. 15A, wherein each of the baffles may move in response to hydrodynamic loads resulting from the hydrodynamic forces.

FIG. 21 is a front elevational view of many baffles 202H. Each baffle 202H may be made from one of the blanks 200H shown in FIG. 15A. The baffles 202H are mounted on many of the hinges 304 in the vertical alignment shown in FIG. 15B, one above the other. The mounted baffles 202H extend between opposite ones of the piers 166, one of which is shown in FIG. 21. Viewing the mounted baffles 202H as shown in FIG. 21, it may be understood that the mounted baffles 202H block a substantial amount (e.g., ninety-eight percent) of a vertical area between opposite columns 166. Each of the baffles 202H may rotate as described above to release the hydrodynamic forces HF. The rotation is from the (solid line) normal orientation (FIG. 15B) into the release orientation (shown in dashed lines in FIG. 15B).

FIG. 22A shows end views of two exemplary ones of the mounted baffles 202H, including some of the hinge 304 (i.e., the hinge aperture 300 provided in the bent channel tab 204A, and the bolt 310). The normal force FF is shown and is not sufficient to rotate the baffles 202H on the hinges 304. The hydrodynamic force HF is shown, and causes the above-described rotation on the axis 301. The two baffles 202H are shown vertically spaced from each other just enough to permit such rotation on the axis 301 of the hinge 304. FIG. 22B shows that the two adjacent baffles 202H may rotate into the release orientation to relieve the hydrodynamic forces HF without touching, or contacting, each other. The hydrodynamic force HF is relieved by the hydrodynamic flow 102FLOW shown in FIG. 22B extending between the rotated baffles 202H.

The hinges 304 have been described above as being configured with first hinge members 298 and second hinge members 303. Also, an example of the first hinge members 298 is said to be the hinge aperture 300, and an example of the second hinge member are the bolt 310, the bushing 312 and the locknut 314. An alternate configuration of the hinges 304 may be provided for mounting the baffle 202H for rotation to provide the same function as the hinge aperture 300 and the bolt 310, the bushing 312 and the locknut 314. For example, the second bracket 326 shown in FIG. 20B may be provided with a welded and threaded stud, rather than the bolt 310 through the second bracket 326. Alternatively, such a welded and threaded stud may be secured to the end channels 206 and suitably secured to the second bracket 326 with similar bushings 312.

FIGS. 23A through 23C show three embodiments of the baffles 202H. Each such embodiment of the baffles 202H is configured and mounted to withstand the hydrodynamic forces HFF and HFR without being broken, to release a substantial amount of the hydrodynamic forces HFF and HFR (not shown in these Figures), and to provide the restorative torque TR (FIG. 15C). Each such embodiment of the baffles 202H is also configured with one of the two hinge members 298 or 303 that may be positioned in the channel tabs 204A and 204B according to which type of a torque member 329 is used to provide the restorative torque TR.

Referring to FIG. 23A, the baffle 202H is shown with the hinge aperture 300 located closely adjacent to the top of the baffle 202H. The hinge aperture 300 may, for example, be located from about one inch to about eleven inches from the top. This is referred to as being adjacent to the top and spaced from the middle 330. A typical exemplary weight WB of the baffle 202H may be about 15 pounds, for example, and may range from about ten pounds to about thirty pounds depending on the expected amount of flow of the liquid 102 in the basin 100, which influences the strength requirements for the baffles 202H.

Referring to FIG. 15C again, and still referring to FIG. 23A, that typical weight WB of the baffle 202H is shown in terms of the force of gravity FGB. The force of gravity FGB of the weight WB is represented for purposes of description as acting at a point 330 in the middle of the length of the baffle 202H (FIGS. 23A through 23C). The baffle 202H shown in FIG. 23A changes orientation (e.g., tilts) from the vertical orientation under the action of the hydrodynamic forces HFF and HFR and rotates to the release orientation shown in FIG. 15C. As such change in orientation occurs, the force of gravity FGB acts on the baffle 202H through the moment arm AB to provide the restorative torque TR. The restorative torque TR acts opposite (clockwise as shown in FIG. 15C) to a torque TH resulting from the hydrodynamic force HFF, for example, which acts counterclockwise, for example. When the hydrodynamic force HFF subsides after the event (which may be an earthquake), the restorative torque TR acting on the baffle 202H returns the baffle 202H to the original vertical, or substantially vertical, orientation shown in solid lines in FIG. 15A. As described, the hinge aperture 300 is shown in FIG. 23A as being near the top of the baffle 202H. As a result, a substantial amount HFFCC of the hydrodynamic force HFF from the event will act counterclockwise on the area of the baffle 202H below the hinge 304 (i.e., on the central area viewed in FIG. 16). Only a very small amount HFFC of the hydrodynamic force HFF will act clockwise. Thus, the net hydrodynamic force HFF that results in the hydrodynamic torque TH will be counterclockwise as shown in FIG. 15C. Also, the hydrodynamic force HFF, for example, generally acts horizontally. As a result, as the baffle 202H changes orientation more and more due to the value of the net hydrodynamic torque TH exceeding the value of the restorative torque TR, less and less area of the baffle 202H (as viewed in FIG. 16, for example) will be presented to the amounts HFFC and HFFCC of the horizontal hydrodynamic forces HFF. Until the values of the hydrodynamic torque TH and the restorative torque TR balance, or are equal and opposite, the baffle 202H will rotate counterclockwise on the hinges 304 in response to the net hydrodynamic torque TH. As the baffle 202H rotates to such balance orientation, and at such balance orientation, the hydrodynamic flow 102FLOW will result and substantially relieve, or lower, the value of the hydrodynamic force HF that acts on the main area of the baffle 202H between the channels 206. As a result, the baffle 202H is thereby less stressed by the hydrodynamic force HF, and applies less force to the piers 164 and 166 than the redwood boards 160 of the baffles 110 or the first embodiment of the baffles 202 apply to such piers given the same value of the hydrodynamic force HFF in each instance.

In review, FIG. 15C shows the torque member 329-1 (e.g., the weight WB of the baffle 202H) acting at the middle point 330 of the baffle 202H and through the moment arm AB measured from the middle point 330 horizontally to a projection of the bolt 310. Because the hinge aperture 300 and axis 301 are near the top of the baffle 202H, the middle point 330 is spaced from and below the bolt 310, which enables the restorative torque TR effective to always tend to return the baffle 202H to the vertical orientation shown in FIG. 23A. A characteristic of stability of the baffle 202H is a characteristic in which the restorative torque TR is always effective to tend to return the baffle 202H to the vertical orientation shown in FIG. 23A. Thus, the configuration of the baffle 202H and the hinge 204 shown in FIG. 22A has the characteristic of stability. It is seen then, that the torque member 329-1 defines an amount of the force FF, for example, of the flow of the liquid 102 to be substantially blocked by the baffle 202H. The torque member 329-1 also defines an amount of hydrodynamic force HF of the flow of the liquid 102 that is to be released by the baffle 202H so that the baffle 202H is not subject to being shattered or broken in response to the hydrodynamic force HF.

FIG. 23B shows another embodiment of the baffle 202H which also has the characteristic of stability, and which is configured with a second embodiment of the torque member 329, referred to as the torque member 329-2. The torque member 329-2 has a selectable weight WTM-2. The baffle 202H is shown in FIG. 23B with the hinge aperture 300 located spaced from the top of the baffle 202H. The spacing may be from about one inch to about ten inches above the middle point 330. This spacing is referred to as being spaced from one of the opposite sides 208 and spaced from the middle 330. The second torque member 329-2 is mounted on a side of the middle 330 opposite to the hinge aperture 300. A typical exemplary weight WTM-2 of the second torque member 329-2 may be about ten pounds, for example, and may range from about five pounds to about thirty-five pounds depending on the amount of the restorative torque TR that is desired. Referring to FIG. 15C again, and still referring to FIG. 23B, that typical weight WTM-2 of the second torque member 329-2 is shown in terms of the force of gravity FGTM. The force of gravity FGTM of the second torque member 329-2 is represented for purposes of description as acting at a point 334 in the middle of the area of the bottom channel tab 204D of the baffle 202H. Thus the baffle 202H shown in FIG. 23B has two torque members, 329-1 and 329-2.

The baffle 202H shown in FIG. 23B changes orientation (e.g., tilts) under the action of the hydrodynamic force HFF, the change being from the vertical orientation to the release orientation. As such change in orientation occurs, the force of gravity FGB acts on the baffle 202H as described above (i.e., through the moment arm AB). This provides a first portion of the restorative torque TR. However, as this change in orientation of the baffle 202H occurs, FIG. 15C shows that the force of gravity FGTM on the torque member 329-2 also acts on the baffle 202H through the moment arm ATM to provide a second portion of the restorative torque TR. Because there are two portions of the restorative torque, this restorative torque of this embodiment is referred to as a combined restorative torque TRC. Moreover, the value of the weight WTM-2 of the torque member 329-2 may be selected with less constraint than the weight of the baffle 202H itself. For example, the gauge of the material used to fabricate the blank 203H may have been selected for many other reasons and may not be easily changeable. Thus, the torque member 329-2 may be configured with a more-easily selected weight WTM-2 for providing the desired total restorative torque TRC from the combined weights WB and WTM-2. The second portion of the restorative torque TRC is shown in FIG. 15C and results from FGTM acting through the moment arm ATM relative to the axis 301 of the bolt 310 and to the point 334. In a manner similar to that described above with respect to FIG. 23A, the restorative torque TRC acts opposite (clockwise as shown) to the torque TH resulting from the hydrodynamic force HFF, for example, which acts counterclockwise, for example. When the hydrodynamic force HFF subsides after the event (which may be an earthquake), the restorative torque TRC acting on the baffle 202H returns the baffle 202H to the original vertical, or substantially vertical, orientation shown in FIG. 15A.

As described, the hinge aperture 300 is shown in FIG. 23B as being away from the top of the baffle 202H, but above the middle of the baffle 202H. As a result, as compared to the embodiment shown in FIG. 23A, a still substantial but less amount HFFCC of the hydrodynamic force HFF from the event will act counterclockwise on the area of the baffle 202H below the hinge 304 (i.e., on the central area viewed in FIG. 16), and some larger amount HFFC of the hydrodynamic force HFF will act clockwise. The net hydrodynamic force HFF that results in the hydrodynamic torque TH will still be clockwise. The hydrodynamic force HFF still generally acts horizontally, and changes the orientation of the baffles 202H, such that the operation of the baffle 202H to release the flow of the liquid 102 will be similar to that described with respect to FIG. 23A. The baffle 202H is thereby less stressed by the hydrodynamic force HFF (than the prior redwood boards 160, for example) and applies less force to the piers 166 than the redwood boards or the first embodiment of the baffles 202 apply to such piers given the same value of the hydrodynamic force HF in each instance.

In review, FIG. 15C shows the torque member 329-1 (e.g., the weight WB of the baffle 202H) acting at the middle point 330 of the baffle 202H and through the moment arm AB measured from the middle point 330 horizontally to a projection of the bolt 310. FIG. 15C also shows the weight WTM-2 of the torque member 329-2 acting on the bottom bent tab 204D at the point 334 and through the moment arm ATM. Although the hinge axis 301 is not adjacent to the top of the baffle 202H, but is just above the middle point 330, both the middle point 330 of the torque member 329-1 (the baffle weight WB) and the point 334 of the torque member 329-2 are still spaced from and below the hinge aperture 300 and the axis 301 of the bolt 310, which enables the restorative torque TRC effective to always tend to return the baffle 202H to the vertical orientation shown in FIG. 23B. Thus, the baffle 202H shown in FIG. 23B has the characteristic of stability. It is seen then, that the torque members 329-1 and 329-2 define an amount of the force FF, for example, of the flow of the liquid 102 to be substantially blocked by the baffle 202H. The torque members 329-1 and 329-2 also define an amount of hydrodynamic force HF of the flow of the liquid 102 that is to be released by the baffle 202H so that the baffle 202H is not subject to being shattered or broken in response to the hydrodynamic force HF.

FIG. 23C shows another embodiment of the baffle 202H which also has the characteristic of stability, and which is also configured with a torque member, here referred to as the torque member 329-3 also having a selectable weight WTM-3. The baffle 202H is shown in FIG. 23C with the hinge aperture 300 and axis 310 located spaced from the top of the baffle 202H and located below the middle point 330. The spacing may be from about one inch to about six inches below the middle point 330. Because of this spacing, there is more of the weight WB of the torque member 329-1 of the baffle 202H above the hinge aperture 300 in the embodiment of the baffles 202H in FIG. 23C than in the embodiment of the baffle 202H shown in FIG. 23B. In view of this, a typical exemplary weight WTM-3 of the torque member 329-3 is greater than the weight WTM-2 of the torque member 329-2, and for example, may be about forty pounds, and may range from about five pounds to about forty pounds depending on the amount of the net restorative torque TR that is desired. With FIG. 15C in mind, and still referring to FIG. 23C, that typical weight WTM-3 of the torque member 329-3 may also be understood in terms of the force of gravity FGTM.

The force of gravity FGTM of the torque member 329-3 is also represented for purposes of description as acting at a point 334 in the middle of the area of the bottom channel tab 204D of the baffle 202H.

The baffle 202H shown in FIG. 23C changes orientation (e.g., tilts) under the action of the torque member 329-1 and the hydrodynamic force HFF and rotates to the release orientation. As such change in orientation occurs, the force of gravity FGB acts on the baffle 202H through the moment arm AB, but because of the location of the middle 330 above the axis 301 (and above the bolt 310 and the hinge aperture 300), the force of gravity FGB acts as a non-restorative torque NRT against the restorative torque TRTM from the torque member 329-3. For illustration, FIG. 15C shows these torques NRT and TRTM even though the baffle 202H in FIG. 15C does not experience such torques. However, as this change in orientation of the baffle 202H occurs under the action of the hydrodynamic force HFF and the weight WB, the force of gravity FGTM on the torque member 329-3 acts on the baffle 202H through the moment arm ATM to provide the restorative torque TRTM having a value greater than the value of the non-restorative torque NRT. Again, the value of the weight WTM-3 of the torque member 329-3 may be selected with less constraint than the value of the weight WB of the baffle 202H itself, although the value of the torque TRTM must be greater than the value of the non-restorative torque NRT to provide the stability that is necessary to return the baffle 202H to the vertical position after the hydrodynamic torque HT subsides. Thus, the torque member 329-3 may also be configured with a more-easily selected weight WTM-3 for providing the desired net restorative torque, which is the net restorative torque from the weight WB acting counterclockwise against the clockwise-acting weight WTM-3 of the torque member 329-3. The restorative torque TRTM acts through a moment arm ATM relative to the axis 301 of the bolt 310 and to the point 342.

Thus, during the event, the restorative torque TRTM acts opposite (clockwise as shown) to both the torque TH resulting from the hydrodynamic forces HFF and the torque NRT from the weight WB of the baffle 202H. When the hydrodynamic forces HFF subside after the event, the net restorative torque (TRTM minus NRT) acting on the baffle 202H returns the baffle 202H to the original vertical, or substantially vertical, orientation shown in FIG. 15A. As described, the hinge aperture 300 is shown in FIG. 23C as being away from the top of the baffle 202H, and below the middle 330 of the baffle 202H. As a result, as compared to the embodiment shown in FIG. 23A, a lesser amount HFFCC of the hydrodynamic force HFF from the event will act counterclockwise on the area of the baffle 202H below the hinge 304 (i.e., the central area viewed in FIG. 16), and a somewhat larger amount HFFC of the hydrodynamic force HFF will act clockwise than with the configuration shown in FIG. 23B. The net hydrodynamic force HFF that results in the hydrodynamic torque TH will be clockwise. The hydrodynamic force HFF still generally acts horizontally, and changes the orientation of the baffle 202H to release the hydrodynamic flow of the liquid 102. The baffle 202H is thereby less stressed by the hydrodynamic force HFF (than the redwood boards 160, for example) and applies less force to the pier 166 than the redwood boards 160 or the first embodiment of the baffles 202 apply to such piers given the same value of the hydrodynamic force HF in each instance.

In review, the torque member 329-1 (e.g., the weight WB of the baffle 202H) acts at the middle point 330 of the baffle 202H and through a moment arm AB measured from the middle point 330 horizontally to a projection of the axis 301 of the bolt 310. The weight WTM-3 of the torque member 329-3 acts on the bottom bent tab 204D at the point 334 and through the moment arm ATM. Although the hinge axis 301 and aperture 300 are not adjacent to the top of the baffle 202H, but are below the middle point 330, the point 334 of the torque member 329-3 is still spaced from and below the hinge aperture 300 and bolt 310. Such spacing below, and the selected weight WTM-3, enable the net restorative torque (TRTM minus NRT) effective to always tend to return the baffle 202H to the vertical orientation shown in FIG. 23C. Thus, the baffle 202H shown in FIG. 23C has the characteristic of stability. It is seen then, that the torque members 329-1 and 329-3 define an amount of the force FF, for example, of the flow of the liquid 102 to be substantially blocked by the baffle 202H. The torque members 329-1 and 329-3 also define an amount of hydrodynamic force HF of the flow of the liquid 102 that is to be released by the baffle 202H so that the baffle 202H is not subject to being shattered or broken in response to the hydrodynamic force HF.

In further review, the torque members 329 may be configured with many variables so that a wide range of desired restorative torque TR may be provided. One such variable may be weight. In this manner, with very heavy torque members 329 (e.g., with weight WTM at the high end of the above range), the value of normal forces FF and FR may be high and yet the baffles 202H will be urged by the force of gravity FGTM (and the resulting restorative torque TR) to remain in the vertical orientation shown in FIG. 23B, for example. If there are increases in the normal forces, the restorative torque TR will still act on the baffle 202H to cause the baffle 202H to remain "substantially" in the vertical orientation. As used herein, "remain substantially in the vertical orientation" means that the baffle 202H stays in a range of the angle a (in FIG. 15C) of about 0.1 degree to about ten degrees (i.e., away from vertical) in the direction (to the right in FIG. 15C) of the normal force FF, for example. Another variable may be the location of the hinge axis 301, which is shown in FIGS. 23A, 23B, and 23C, for example, and results in different directions of the torque (e.g., NRT) resulting from the weight WB of the baffle 202H, for example.

Another variable may be the density of the material from which the torque member 329 is made. Generally, the density is greater than that of the liquid 102. For example, an inexpensive suitably dense material may be concrete, which may be placed in the bottom channel 206 as shown in FIGS. 23B and 23C. Other suitably dense materials for the torque members may be stainless steel.

Another method of the present invention may be provided for fabricating the blank 200H. The method may be as shown in conjunction with FIGS. 7A through 7C and with reference to the flow chart 236 shown in FIG. 10A. The method starts with an operation 237 of providing the baffle blank 200H as described above with respect to FIG. 15A. The remaining operations are as set forth in FIG. 10A. Another method of the present invention may be provided for defining baffle 202H with structural channels 206 and the hinge members 298. The method is shown in conjunction with FIGS. 9A through 9H, and is described in a flow chart 250 of FIG. 10B. In an operation 252 the sheet 203H, and the tabs 204 integral with the sheet 203, are provided as described above with respect to FIG. 15A. Operation 252 may be performed according to the flow chart 236 shown in FIG. 10A, for example, with the first hinge members 298 provided in the blank 200H. The method is otherwise the same as set forth in FIG. 10B and described above with respect to FIG. 10B.

Figure 24A:
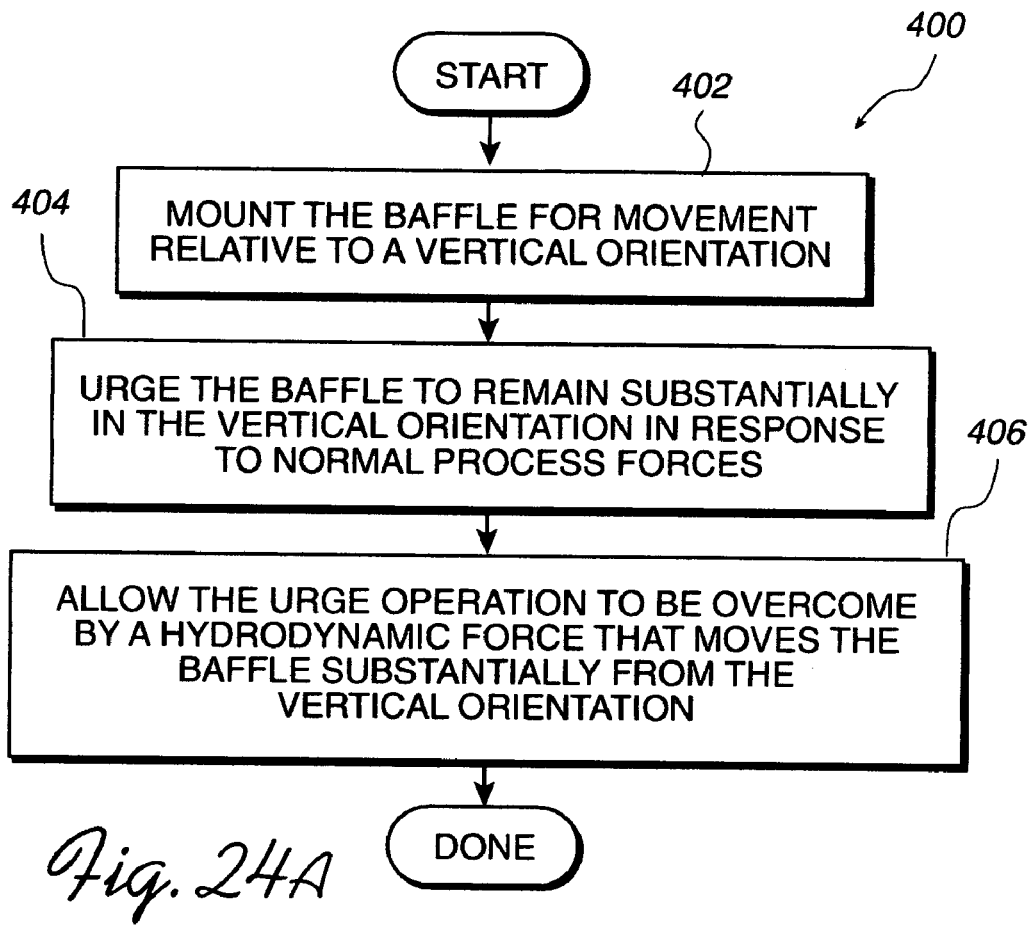
FIGS. 24A and 24B illustrate flow charts of methods of the present invention in which the hydrodynamic forces are relieved by a baffle shown in FIG. 16.

Another method of the present invention may be understood by reference to FIG. 24A, which shows a flow chart 400. The method releases the hydrodynamic forces HF imposed on the baffle 202H without breaking the baffle apart. The method moves to an operation 402 in which the baffle 202H is mounted for movement relative to a vertical orientation. The vertical orientation may be any of those orientations of the baffles 202H shown in FIGS. 23A through 23C, for example. The mounting for movement may be by providing any first hinge member 298 in cooperation with any second hinge member 303, so that the baffle is supported for rotation on the axis 301. In the example of FIG. 18, the first hinge member 298 may be the hinge aperture 300, which may cooperate with the bolt 310, the bushing 312, and the locknut 314 of the second hinge member 303.

The method moves to an operation 404 in which the baffle 202H is urged to remain substantially in the vertical orientation in response to the normal forces FF and FR, for example. The "remaining substantially in the vertical orientation" is as defined above so as to allow some movement (or rotation) of the baffle 202H around the axis 301, but not enough rotation as to interfere with the normal operation of the equipment (e.g., a settler) referred to above as being operative in the basin 100. The urging in operation may be provided, for example, by selection of any of the many variables described above for the torque member 329, so that one selected restorative torque of the wide range of desired restorative torques TR may be provided. For example, when the basin 100 with the baffles 202H is in a very earthquake-prone location, the value of the weight WTM of the torque members 329 may be at the high end of the above weight ranges, and the piers and the baffles 202H may be made stronger than in non-earthquake-prone locations, so that the equipment may remain operative (without release of low hydrodynamic forces HF) even in minor earthquakes (e.g., low Richter scale values such as 4.5).

The method moves to an operation 406 in which the urging operation 404 is allowed to be overcome by the hydrodynamic force HF for which the baffle 202H is configured to release. The release occurs when that hydrodynamic force HF moves the baffle 202H substantially relative to the vertical orientation. Such substantial movement may be rotation on the axis 301 by more than the above-described "substantially in the vertical orientation", i.e., movement beyond the normal orientation, which may be in the range of the angle a (in FIG. 15C) of about 0.1 degree to about ten degrees. Thus, the allowing operation 406 allows the baffle 202H to release, which is to move beyond what is "remaining substantially in the vertical orientation" as defined above so as to allow substantial movement (or rotation) of the baffle 202H around the axis 301, and to allow release of most of the forces HF. Such substantial movement may be enough to interfere with the normal operation of the equipment (e.g., a settler) referred to above as being operative in the basis 100. However, this method has the advantage of releasing the hydrodynamic forces HF imposed on the baffle 202H without breaking the baffle apart, such that it will be unlikely that the baffles 202H will damage the equipment.

The urging in operation 404 may be provided, for example, by selection of any of the many variables described above for the torque member 329, so that one selected restorative torque of the wide range of desired restorative torque TR may be provided. For example, when the basin 100 with the baffles 202H is in a very earthquake-prone location, the value of the weight WTM of the torque members 329 may be at the high end of the above range and the piers and the baffles 202H may be made stronger than in non-earthquake-prone locations, so that the equipment may remain operative (without release of low hydrodynamic forces HF) even in minor earthquakes (e.g., low Richter scale values such as 4.5.

Figure 24B:
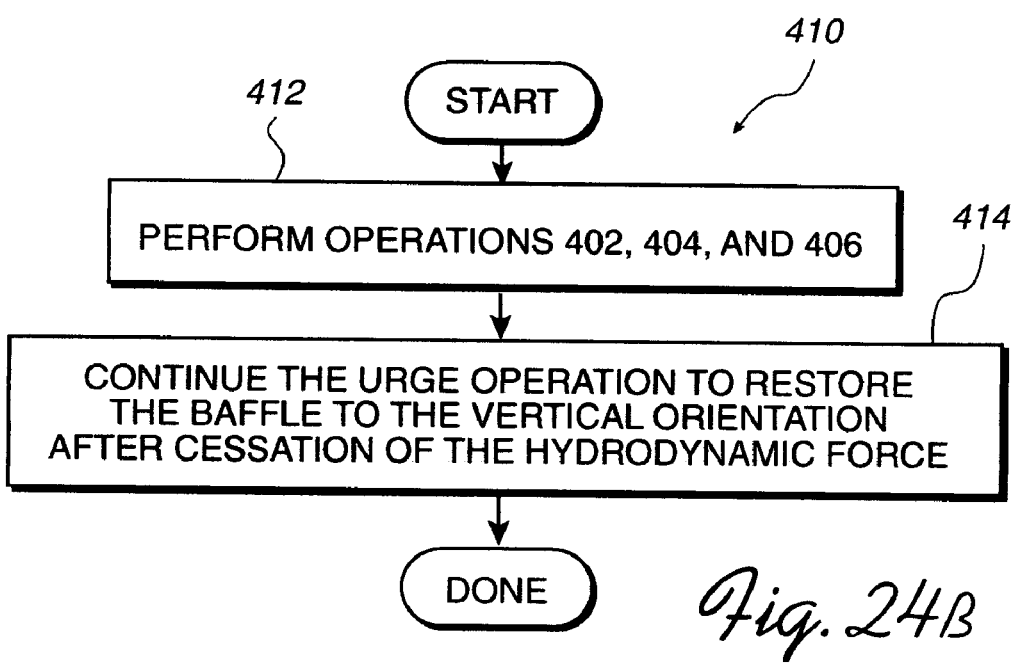

Another method of the present invention may be understood by reference to FIG. 24B, which shows a flow chart 410. This method not only releases the hydrodynamic forces HF imposed on the baffle 202H without breaking the baffle apart, but also restores the baffle 202H to the vertical orientation. The method moves to an operation 412 which calls the operations 402, 404, and 406 of FIG. 24A. Thus, the hydrodynamic forces HF imposed on the baffle 202H are released without breaking the baffle apart. The method then moves to an operation 414 of continuing to urge the baffle 202H to restore the baffle 202H to the vertical orientation after cessation of the hydrodynamic forces HF from the event (e.g., earthquake). Initially, operation 414 applies the force of gravity FFGM on the baffle 202H as described above, which may tend to dampen, or reduce, subsiding hydrodynamic forces HF from the event (earthquake). Over time, the hydrodynamic forces HF from the event will subside more and more, such that the continuing of the urging of the baffle 202H to restore the baffle 202H to the vertical orientation will, after cessation of the hydrodynamic forces HF from the event (e.g., earthquake), return the baffle 202H to the vertical orientation. From time to time as aftershocks occur, operation 414 may be effective to continue to urge the baffle 202H to restore the baffle 202H to the vertical orientation, so that after cessation of the hydrodynamic forces HF from the aftershocks of the event, operation 414 will return the baffle 202H to the vertical orientation, or to the substantially vertical orientation. HF from the event (e.g., earthquake), return the baffle 202H to the vertical orientation. From time to time as aftershocks occur, operation 414 may be effective to continue to urge the baffle 202H to restore the baffle 202H to the vertical orientation, so that after cessation of the hydrodynamic forces HF from the aftershocks of the event, operation 414 will return the baffle 202H to the vertical orientation, or to the substantially vertical orientation.

In review, the present invention is seen to fill the above needs by providing one embodiment of the baffle 202H having no shape-holding facilities other than bends that define and hold the shape, or configuration, of structural channels, wherein the baffle 202H may control the flow of the liquid 102 in any of the above-described liquid treatment equipment, e.g., for the contact-type or the physical-type of processes, and wherein the baffle 202H is not subject to being shattered or broken in response to the hydrodynamic forces HF. The present invention also fills these needs through methods of providing an unbent blank 200H for making such baffle 202H. The present invention fills these needs by providing an embodiment of a preferably stainless steel unbent baffle blank 200H that may be deformed by bending into a configuration that defines a plurality of structural channels of the baffle 202H, wherein the deformed blank need not be held bent in such configuration by any fastener or welding, for example, and wherein the plurality of structural channels render the baffle 202H able to withstand the various respective normal forces FF, for example, applied to the baffle 202H by the respective incoming liquid, and wherein pairs of the plurality of structural channels 206 are configured to render the baffle 202H able to withstand the uncontrolled hydrodynamic forces HF applied to the baffle 202H during an event such as an earthquake. Such bent baffle 202H (that is not welded or fastened or otherwise secured in the desired bent configuration) is thus referred to as a "soley-bent" baffle 202H to indicate, or describe, the structural characteristic of only being bent into a configuration implementing the desired plurality of structural channels, and to indicate, or describe, the structural characteristic of staying in such bent configuration without being retained in such configuration by welds or fasteners, or by any other structure added to the bent material from which the blank baffle is made. Additionally, the solely-bent baffle 202H may not only have the above-described characteristics, but may be configured to withstand the hydrodynamic forces HF without being shattered or broken. Still further, such a baffle 202H does not require immediate post-earthquake maintenance before normally functioning once again to block the normal flow of the liquid having the force HF.

The present invention has been described as filling the above needs by providing the baffle 202H having no shape-holding facilities other than bends that define and hold the shape of the structural channels 206. It will be apparent that certain changes and modifications to the baffle 202H may be practiced and be within the scope of the present invention. For example, materials other than stainless steel may be used to make the baffle 202H. Such other materials may be glass fiber such as glass fiber reinforced polyester, or pultruded FRP, for example, of a baffle 202H-G shown in FIG. 25A. There, the configuration of the structural channels 206 has been changed, yet the baffle 202H still has the capacity to withstand the normal forces FF and FR that act between the piers 166, e.g., the baffles 202H will not become bowed under the action of such forces FF or FR. For example, FIGS. 25A and 25B show the baffle 202H configured as a glass fiber reinforced polyester baffle 202H-G with the corrugations 440. The corrugations 440 may be in the form of channel sections 441. A top channel section 442 may be provided with a tab 443 secured to each of outer ends 444 of the top channel section 442. The tabs 443 may, as shown, extend to the bottom of the corrugations 440. The tabs 443 may be configured with the first hinge members 298, such as the hinge apertures 300, for support on the second hinge members 303 as described above with respect to FIGS. 18 and 19, for example. The corrugations 440 enable the top channel section 442, for example, of the baffle 202H-G to withstand the forces FF and FR by being and remaining essentially straight when mounted on the second hinge members 303 between the piers 166 as shown in FIG. 6. Also, the corrugations 440 and the tabs 443 enable the opposite outer ends 444 of the baffle 202H-G to be and remain straight notwithstanding the weight WTM of the torque member 329, which in this embodiment is referred to as the torque member 329-4. The torque member 329-4 may be elongated and secured to a bottom 446 of a bottom channel 441 for operation in the manner of the torque members 329-2 and 329-3 shown in respective FIGS. 23B and 23C.

As another example of a change or modification that may be made to the baffle 202H and be within the scope of the present invention, reference is made to FIG. 25C. The baffle 202H is referred to as the baffle 202H-W and is configured as a self-supporting rectangular plank 450 having the first hinge members 298, such as the hinge apertures 300. The hinge apertures 300 are configured to be mounted on the second hinge members 303. For example, a top 452 may be provided with a recess (not shown) and be supported on the bolt 310, with the bushing 312 and the locknut 314 of the hinge member 303 as described above with respect to FIG. 18. For installations in which there is a need to retrofit existing redwood baffles to render such baffles no longer subject to being shattered or broken in response to the hydrodynamic forces HF, the plank may be made of used redwood, for example, and the benefits of the hinge 304 and the torque member 329 may be achieved. The torque member 329-5 may be elongated and secured to a bottom edge 454 of the plank 450 for operation in the manner of the torque members 329-2 and 329-3 shown in respective FIGS. 23B and 23C.

It may be understood that the baffles 202H-G and 202H-W may be mounted in the basin 100 in the same manner as shown for the baffle 202H (e.g., see FIGS. 21, 23A, 23B and 23C) for operation as described with respect to FIGS. 23A, 23B, and 23C, for example. In review, it may be understood that each of the baffles 202H of the present invention may releasably block a portion of flow of the liquid 102 in a flow path. The flow path may be defined by a closed perimeter that may extend along the surface of the liquid between the piers 166, for example, and along each pier 166, and between the piers 166 through a point above the bottom 136 of the basin 100 to the upper surface of the liquid 102. A rigid self-supporting panel may be provided in the form of any of the baffles 202H. Each such baffle 202H is configured to overlap the portion of the closed perimeter in that each such baffle extends between the piers 166 and from the point above the bottom to the upper surface of the liquid 102. The baffle 202H may be provided with the first hinge member 298 configured to mount the panel in a normal process orientation (e.g., vertical or substantially vertical, see solid lines in FIG. 15B) overlapping the portion of the closed perimeter to substantially block the flow path. The first hinge member 298 may further be configured to allow the panel to move partially from the normal orientation to release the flow of the liquid 102FLOW (see dashed lines FIG. 15B). The panel may be further configured with any of the torque members 329 (FIGS. 23A through 23C) to define an amount of a force FF of the flow of the liquid 102 to be substantially blocked by the panel (FIG. 22A), which may occur when the panel remains substantially in the vertical orientation as defined above. The torque members 329 may also define an amount of the hydrodynamic force HF (FIG. 15C) of the flow of the liquid 102 to be released by the panel (as the flow 102FLOW, FIG. 22B) so that the panel is not subject to being shattered or broken in response to the hydrodynamic force HF (FIG. 22B, for example). Thus, when the panel with the torque member 329 has remained substantially in the vertical orientation (as defined above) when subject to that amount of the normal force FF, the panel will release in response to that amount of hydrodynamic force HF, which is usually much in excess of the force FF.

It may also be understood that the panels described above may have a first axis in the form of the axis 301 (FIG. 25C). The axis may extend across a first side (e.g., 206) of a top baffle 202H (FIG. 15B), which may be adjacent to the upper surface of the liquid 102 and the flow perimeter. Also, a second axis 460 (FIG. 25C) may extend along a second length of the panel (e.g., vertically). The first hinge members 298 may be parallel to the first axis 301 (as shown by the coaxial relationship in FIGS. 20A and 25C, for example). As shown in FIG. 25C, for example, the torque member 329 is located along such second axis 460 spaced from the first axis 301. As described with respect to FIG. 15C, the torque member 329 applies a restorative torque TR to the panel in opposition to the amount of the force FF, for example, of the flow of the liquid 102 substantially blocked by the panel.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A flow controller for releasably blocking a flow of liquid in a flow path defined by a closed perimeter, the flow controller comprising:
a rigid self-supporting panel configured to overlap the closed perimeter, the panel being provided with a first hinge member configured to mount the panel in a normal orientation overlapping the closed perimeter to substantially block the flow path, the first hinge member being further configured to allow the panel to move from the normal orientation to release the flow of the liquid, the panel being further configured with a torque member to define an amount of a normal process force of the flow of the liquid to be substantially blocked by the panel and an amount of a hydrodynamic force of the flow of the liquid to be released by the panel, the panel being further configured with a series of offsets to define channels configured to resist the amount of the normal process force of the flow of the liquid to be substantially blocked by the panel, the channels comprising a top channel section; the first hinge member being configured in the top channel section; and the torque member being configured with a weight having a selected value which when acting around the first hinge member defines the amount of the normal process force of the flow of the liquid to be substantially blocked by the panel and the amount of the hydrodynamic force of the flow of the liquid to be released by the panel.

2. A flow controller having a characteristic of stability in a generally horizontal flow path, flow in the flow path being characterized by normal process flow having a normal range of flow force values, the flow being further characterized by seismic-induced flow having an abnormal range of flow force values substantially exceeding the normal range of flow force values, the flow controller comprising:
a rigid self-supporting panel configured with a hinge mounting the panel in a normal vertical orientation across the flow path, the hinge being configured to allow the panel to move from the normal vertical orientation to a flow release orientation; and
a torque member mounted on the panel and configured to urge the panel to resist the normal range of flow force values of the normal process flow by the panel remaining substantially in the vertical orientation and releasably blocking the flow path, the torque member being further configured so that the urging of the panel to resist the normal range of flow force values of the normal process flow is overcome by a seismic force within the abnormal range of flow force values, the configuration of the torque member being such that in response to the seismic force the panel moves to the release orientation so that flow force in the abnormal range is released by movement of the panel to the release orientation.

* * * * *